US011399016B2

(12) United States Patent
Malleron

(10) Patent No.: US 11,399,016 B2
(45) Date of Patent: Jul. 26, 2022

(54) SYSTEM AND METHOD FOR IDENTIFYING EXCHANGES OF ENCRYPTED COMMUNICATION TRAFFIC

(71) Applicant: Verint Systems Ltd., Herzliya Pituach (IL)

(72) Inventor: Itay Malleron, Tel Aviv (IL)

(73) Assignee: COGNYTE TECHNOLOGIES ISRAEL LTD., Pituach (IL)

( * ) Notice: Subject to any disclaimer, the term of this patent is extended or adjusted under 35 U.S.C. 154(b) by 0 days.

(21) Appl. No.: 17/082,152

(22) Filed: Oct. 28, 2020

(65) Prior Publication Data
US 2021/0136045 A1    May 6, 2021

(30) Foreign Application Priority Data

Nov. 3, 2019 (IL) .......................................... 270391
Nov. 3, 2019 (IL) .......................................... 270392

(51) Int. Cl.
*H04L 9/40* (2022.01)
*H04L 67/02* (2022.01)
*H04L 69/16* (2022.01)

(52) U.S. Cl.
CPC .......... *H04L 63/0428* (2013.01); *H04L 63/20* (2013.01); *H04L 67/02* (2013.01); *H04L 69/16* (2013.01)

(58) Field of Classification Search
None
See application file for complete search history.

(56) References Cited

U.S. PATENT DOCUMENTS 5,689,442 A  11/1997 Swanson et al.
6,404,857 B1  6/2002 Blair et al.
(Continued)

FOREIGN PATENT DOCUMENTS

EP  0989499  3/2000
EP  1325655  1/2007
(Continued)

OTHER PUBLICATIONS

International Search Report and Written Opinion, dated Dec. 21, 2020, received in connection with corresponding International Patent Application No. PCT/IB2020/060102.

(Continued)

*Primary Examiner* — Davoud A Zand
(74) *Attorney, Agent, or Firm* — Isus Intellectual Property PLLC; Anthony Jason Mirabito

(57) ABSTRACT

Systems and methods for identifying sequences of encrypted packets that carry files between clients and application servers, and for estimating the sizes of these files. A traffic-monitoring system searches the traffic for connections that appear to carry file content. The system estimates the number of files that were transferred over the connection. Next, the system estimates the respective sizes of one or more of the files that were transferred over the connection. To perform this estimation, the system first "peels away" as many lower-level protocol headers as possible from each of the packets that carries part of the file, and identifies the size that is specified in the lowest-level payload that remains. Next, the system tallies the specified sizes. Finally, the system reduces the packet-size tally to account for an estimated overhead due to the encryption of the packets.

24 Claims, 6 Drawing Sheets

(56) References Cited

U.S. PATENT DOCUMENTS

| | | |
|---|---|---|
| 6,718,023 B1 | 4/2004 | Zolotov |
| 6,741,992 B1 | 5/2004 | McFadden |
| 6,757,361 B2 | 6/2004 | Blair et al. |
| 7,088,677 B1 | 8/2006 | Burst |
| 7,134,141 B2 | 11/2006 | Crosbie |
| 7,216,162 B2 | 5/2007 | Amit et al. |
| 7,225,343 B1 | 5/2007 | Honig et al. |
| 7,269,157 B2 | 9/2007 | Klinker et al. |
| 7,287,278 B2 | 10/2007 | Liang |
| 7,466,816 B2 | 12/2008 | Blair |
| RE40,634 E | 2/2009 | Blair et al. |
| 7,587,041 B2 | 9/2009 | Blair |
| 7,650,317 B2 | 1/2010 | Basu et al. |
| 7,769,875 B1 | 8/2010 | Moisand et al. |
| 7,882,217 B2 | 2/2011 | Katzir |
| 7,941,827 B2 | 5/2011 | John |
| 8,005,897 B1 | 8/2011 | Roka et al. |
| 8,037,167 B1 | 10/2011 | Bellovin |
| RE43,103 E | 1/2012 | Rozman et al. |
| 8,176,527 B1 | 5/2012 | Njemanze et al. |
| 8,201,245 B2 | 6/2012 | Dewey et al. |
| RE43,528 E | 7/2012 | Rozman et al. |
| RE43,529 E | 7/2012 | Rozman et al. |
| 8,224,761 B1 | 7/2012 | Rockwood |
| RE43,987 E | 2/2013 | Rozman et al. |
| 8,402,543 B1 | 3/2013 | Ranjan et al. |
| 8,413,244 B1 | 4/2013 | Nachenberg |
| 8,463,855 B2 | 6/2013 | Adams et al. |
| 8,499,348 B1 | 7/2013 | Rubin |
| 8,578,493 B1 | 11/2013 | McFadden |
| 8,665,728 B2 | 3/2014 | Altman |
| 8,682,812 B1 | 3/2014 | Ranjan |
| 8,762,948 B1 | 6/2014 | Zaitsev |
| 8,838,951 B1 | 9/2014 | Hicks et al. |
| 8,839,417 B1 | 9/2014 | Jordan |
| 8,850,579 B1 | 9/2014 | Kalinichenko |
| 8,869,268 B1 | 10/2014 | Barger |
| 9,225,829 B2 | 12/2015 | Agúndez Dominguez et al. |
| 9,804,752 B1 | 10/2017 | Mall |
| 2002/0129140 A1 | 9/2002 | Peled et al. |
| 2003/0097439 A1 | 5/2003 | Strayer et al. |
| 2003/0103461 A1 | 6/2003 | Jorgenson |
| 2005/0018618 A1 | 1/2005 | Mualem et al. |
| 2005/0041590 A1 | 2/2005 | Olakangil et al. |
| 2005/0105712 A1 | 5/2005 | Williams et al. |
| 2005/0108377 A1 | 5/2005 | Lee et al. |
| 2006/0026680 A1 | 2/2006 | Zakas |
| 2006/0146879 A1 | 7/2006 | Anthias et al. |
| 2007/0016528 A1* | 1/2007 | Verhaegh ............ G06F 21/6245 705/50 |
| 2007/0027966 A1 | 2/2007 | Singhal et al. |
| 2007/0180509 A1 | 8/2007 | Swartz et al. |
| 2007/0186284 A1 | 8/2007 | McConnell |
| 2007/0192863 A1 | 8/2007 | Kapoor et al. |
| 2007/0294768 A1 | 12/2007 | Moskovitch et al. |
| 2008/0014873 A1 | 1/2008 | Krayer et al. |
| 2008/0028463 A1 | 1/2008 | Dagon et al. |
| 2008/0069437 A1 | 3/2008 | Baker |
| 2008/0141376 A1 | 6/2008 | Clausen et al. |
| 2008/0177994 A1* | 7/2008 | Mayer .................... G06F 16/00 709/224 |
| 2008/0184371 A1 | 7/2008 | Moskovitch et al. |
| 2008/0196104 A1 | 8/2008 | Tuvell et al. |
| 2008/0222127 A1 | 9/2008 | Bergin |
| 2008/0261192 A1 | 10/2008 | Huang et al. |
| 2008/0267403 A1 | 10/2008 | Boult |
| 2008/0285464 A1 | 11/2008 | Katzir |
| 2009/0106842 A1 | 4/2009 | Dude |
| 2009/0150999 A1 | 6/2009 | Dewey et al. |
| 2009/0158430 A1 | 6/2009 | Borders |
| 2009/0216760 A1 | 8/2009 | Bennett |
| 2009/0249484 A1 | 10/2009 | Howard et al. |
| 2009/0271370 A1 | 10/2009 | Jagadish et al. |
| 2009/0282476 A1 | 11/2009 | Nachenberg et al. |
| 2010/0002612 A1 | 1/2010 | Hsu et al. |
| 2010/0037314 A1 | 2/2010 | Perdisci et al. |
| 2010/0061235 A1 | 3/2010 | Pai et al. |
| 2010/0071065 A1 | 3/2010 | Khan et al. |
| 2010/0082751 A1 | 4/2010 | Meijer et al. |
| 2010/0100949 A1 | 4/2010 | Sonwane |
| 2010/0161795 A1 | 6/2010 | Derridder et al. |
| 2010/0306185 A1 | 12/2010 | Smith et al. |
| 2011/0099620 A1 | 4/2011 | Stavrou et al. |
| 2011/0154497 A1 | 6/2011 | Bailey |
| 2011/0167494 A1 | 7/2011 | Bowen et al. |
| 2011/0271341 A1 | 11/2011 | Satish et al. |
| 2011/0302653 A1 | 12/2011 | Frantz et al. |
| 2011/0320816 A1 | 12/2011 | Yao et al. |
| 2012/0017281 A1 | 1/2012 | Banerjee |
| 2012/0110677 A1 | 5/2012 | Abendroth et al. |
| 2012/0167221 A1 | 6/2012 | Kang et al. |
| 2012/0174225 A1 | 7/2012 | Shyamsunder et al. |
| 2012/0222117 A1 | 8/2012 | Wong et al. |
| 2012/0304244 A1 | 11/2012 | Xie et al. |
| 2012/0311708 A1 | 12/2012 | Agarwal et al. |
| 2012/0327956 A1 | 12/2012 | Vasudevan |
| 2012/0331556 A1 | 12/2012 | Alperovitch et al. |
| 2013/0014253 A1 | 1/2013 | Neou |
| 2013/0018964 A1 | 1/2013 | Osipkov et al. |
| 2013/0096917 A1 | 4/2013 | Edgar et al. |
| 2013/0144915 A1 | 6/2013 | Ravi et al. |
| 2013/0151616 A1 | 6/2013 | Amsterdamski |
| 2013/0191917 A1 | 7/2013 | Warren et al. |
| 2013/0333038 A1 | 12/2013 | Chien |
| 2014/0059216 A1 | 2/2014 | Jerrim |
| 2014/0075557 A1 | 3/2014 | Balabine et al. |
| 2014/0101781 A1* | 4/2014 | Bouknight ............ G06F 21/105 726/28 |
| 2014/0207917 A1 | 7/2014 | Tock et al. |
| 2014/0298469 A1 | 10/2014 | Marion et al. |
| 2015/0006755 A1 | 1/2015 | Turlington et al. |
| 2015/0055594 A1 | 2/2015 | Nirantar et al. |
| 2015/0135265 A1 | 5/2015 | Bagrin |
| 2015/0135326 A1 | 5/2015 | Bailey, Jr. |
| 2015/0163187 A1 | 6/2015 | Nasir et al. |
| 2015/0215429 A1 | 7/2015 | Weisblum et al. |
| 2015/0310188 A1* | 10/2015 | Ford .................. H04L 63/0428 726/28 |
| 2015/0341297 A1 | 11/2015 | Barfield et al. |
| 2016/0197901 A1 | 7/2016 | Lester et al. |
| 2016/0285978 A1 | 9/2016 | Zlatokrilov |
| 2017/0013000 A1 | 1/2017 | El-Moussa et al. |
| 2017/0099240 A1 | 4/2017 | Evnine et al. |
| 2017/0142039 A1 | 5/2017 | Martinazzi et al. |
| 2017/0193230 A1* | 7/2017 | Jevnisek ............... G06F 21/564 |
| 2017/0325286 A1* | 11/2017 | Le ......................... H04L 12/64 |
| 2018/0109542 A1 | 4/2018 | Katzir et al. |
| 2018/0212845 A1 | 7/2018 | Eriksson et al. |
| 2018/0316638 A1 | 11/2018 | Yishay et al. |
| 2019/0164082 A1 | 5/2019 | Wu |
| 2019/0207880 A1 | 7/2019 | Georgiou |
| 2019/0207888 A1 | 7/2019 | Kasheff et al. |
| 2019/0207892 A1 | 7/2019 | Handte et al. |
| 2019/0340945 A1 | 11/2019 | Malhotra et al. |
| 2019/0370854 A1 | 12/2019 | Gao et al. |
| 2020/0143241 A1 | 5/2020 | Gao et al. |
| 2021/0136045 A1* | 5/2021 | Malleron ............. G06F 21/602 |

FOREIGN PATENT DOCUMENTS

| | | |
|---|---|---|
| EP | 2104044 | 9/2009 |
| EP | 2437477 | 4/2012 |
| JP | 2019/079280 | 5/2019 |
| WO | 2012/075347 | 6/2012 |

OTHER PUBLICATIONS

Aho, Alfred V., et al., "Efficient String Matching: An Aid to Bibliographic Search," Communication of the ACM, Jun. 1975, vol. 18, No. 6, pp. 333-340.

Altshuler, Y., et al., "How Many Makes a Crowd? On the Evolution of Learning as a Factor of Community Coverage," LNCS 7227, 2012, pp. 43-52.

(56) References Cited

OTHER PUBLICATIONS

Altshuler, Y., et al., "Incremental Learning with Accuracy Prediction of Social and Individual Properties from Mobile-Phone Data," IEEE, 2011, 10 pages.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Atkinson, M., et al., "Near Real Time Information Mining in Multilingual News," World Wide Web Conference, Apr. 20-24, 2009, 2 pages.
Bailey, M., et al., "Automated Classification and Analysis of Internet Malware," RAID, 2007, pp. 178-197.
Barsamian, A., et al., "Identifying Network Users Using Flow-Based Behavioral Fingerprinting," FlowTraq, 2013, 23 pages.
Bar-Yanai, R., et al., "Realtime Classification for Encrypted Traffic," Lecture Notes in Computer Science, vol. 6049, 2010, pp. 373-385.
Bayer, U., et al., Scalable, Behavior-Based Malware Clustering, Secure Systems Lab, Technical University, Vienna, 2009, 18 pages.
Bellovin, S., "A Technique for Counting NATted Hosts," Proceedings of the $2^{nd}$ ACM SIGCOMM Workshop in Internet measurement, 2002, pp. 267-272.
Bilge, Leyla, et al., "Exposure: Finding Malicious Domains Using Passive DNS Analysis," Feb. 2011, 17 pages.
Blum, A., et al., "Combining Labeled and Unlabeled Data with Co-Training," School of Computer Science, Carnegie Mellon University, Proceedings of the Eleventh Annual Conference on Computational Learning theory (COLT'98), 1998, pp. 92-100.
Bokde, D.K., et al., "Role of Matrix Factorization Model in Collaborative Filtering Algorithm: A Survey," International Journal of Advance Foundation and Research in Computer (IJAFRC), vol. 1, Issue 6, 2014, 6 pages.
Bursztein, E., "Time has something to tell us about Network Address Translation," Jul. 2007, 6 pages.
Chen, N., et al., "Mobile App Tagging," WSDM '16, San Francisco, CA, Feb. 22-25, 2016, pp. 63-72.
Chen, Y-C, et al., "OS Fingerprinting and Tethering Detection in Mobile Networks," Proceedings of the 2014 Conference on Internet Measurement, 2014, pp. 173-179.
Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Cohen, M.I., "Source attribution for network address translated forensic captures," Digital Investigation, vol. 5, 2009, pp. 38-145.
Conti, M., et al., "Can't You Hear Me Knocking: Identification of User Action on Android Apps via Traffic Analysis," arXiv.org>cs>arXiv:1407.7844, Cornell University 2014, 8 pages.
Corney, M., et al. "Gender-Preferential Text Mining of E-mail Discourse," Proceedings of the 18the Annual Computer Security Applications Conference, 2002, 8 pages.
De Vel, O., et al., "Language and Gender Author Cohort Analysis of E-mail for Computer Forensics," Defence Science and Technology Organisation, Australia, 2002, 16 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Dietrich, C.J., et al., "CoCoSpot: Clustering and recognizing botnet command and control channels using traffic analysis," 2012, pp. 475-486.
Eagle, N., et al., "Inferring friendship network structure by using mobile phone data," PNAS, vol. 106, No. 36, 2009, pp. 15274-15278.

Eslahi, M., "botAnalytics: Improving HTTP-Based Botnet Detection by Using Network Behavior Analysis system," Dissertation, Faculty of Computer Science and Information Technology, University of Malaya, 2010, 124 pages.
Estival, D., et al., "Author Profiling for English Emails," Proceedings of the $10^{th}$ Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Gokcen, Y., "A Preliminary Study for Identifying NAT Traffic Using Machine Learning," Thesis, Dalhousie University, Halifax, Nova Scotia, Canada, 2014, 80 pages.
Gokcen, Y., "Can we identify, NAT behavior by analyzing Traffic Flows," IEEE Security and Privacy Workshops, 2014, pp. 132-139.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Grolman, E., et al., "Transfer Learning for User Action Identification in Mobile Apps via Encrypted Traffic Analysis," IEEE Intelligent Systems, vol. 33, Issue 2, 2018, pp. 40-53.
Gu, G., et al., "BotMiner: Clustering Analysis of Network Traffic for Protocol- and Structure-Independent Botnet Detection," Usenix Security Symposium, vol. 5, No. 2, XP61009228, 2008, 16 pages.
Gu, G., et al., "BotSniffer: Detecting Botnet Command and Control Channels in Network Traffic," Proceedings of the $15^{th}$ Annual Network and Distributed System Security Symposium (NDSS'08), San Diego, California, 2008, 18 pages.
Hanneke, S., et al., "Iterative Labeling for Semi-Supervised Learning," Tech. Rep. No. UIUCDCS-R-2004-2442, Computer Science Department, University of Illinois at Urbana-Champaign, 2004, 13 pages.
Huang, D-J, et al., "Clock Skew Based Client Device Identification in Cloud Environments," $26^{th}$ IEEE International Conference on Advanced Information Networking and Applications, 2012, pp. 526-533.
Jacob, G., et al., "Jackstraws: Picking Command and Control Connections from Bot Traffic," Proceedings of the $20^{th}$ Usenix Security Symposium, San Francisco, 2011, 16 pages.
Kohno, T., "Remote Physical Device Fingerprinting," IEEE Transactions on Dependable and Secure Computing, vol. 2, No. 2, 2005, pp. 93-108.
Lakhina, A., et al., "Mining Anomalies Using Traffic Feature Distributions," SIGCOMM, 2005, pp. 217-228.
Lin, Z., et al., "Automatic Protocol Format Reverse Engineering through Context-Aware Monitored Execution," Proceedings of the Network and Distributed System Security Symposium, San Diego, California, 2008, 17 pages.
Liu, R-T., et al., "A Fast Pattern-Match Engine for Network Processor-based NIDS," Proceedings of the $20^{th}$ International Conference on Information Technology (ITCC'04), 2006, 23 pages.
Livadas, C., et al., "Using Machine Learning Techniques to Identify Botnet Traffic," In $2^{nd}$ IEEE LCN Workshop on Network Security (WoNS'2006), 2006, pp. 967-974.
Malmi, E., et al., "You Are What Apps You Use: Demographic Prediction Based on User's Apps," http://www.idigitaltimes.com/what-do-your-apps-say-about-you-new-app-iphone-here-tell-you-410883, 2016, 4 pages.
McHugh, J., et al., "Passive Network Forensics: Behavioural Classification of Network Hosts Based on Connection Patterns," ACM SIGOPS Operating Systems Review, vol. 42, Issue 3, 2008, pp. 99-111.
Mohrehkesh, S., et al., "Demographic Prediction of Mobile User from Phone Usage," Proceedings Mobile Data Challenge by Nokia Workshop, Newcastle, United Kingdom, 2012, 4 pages.

(56) References Cited

OTHER PUBLICATIONS

Mongkolluksamee, S., et al., Enhancing the Performance of Mobile Traffic Identification with Communication Patterns, Conference Paper, 2015, 11 pages.
Navarro, Gonzalo, et al., "Flexible Pattern Matching in Strings: Practical On-Line Search Algorithms for Texts and Biological Sequences," Cambridge University Press, 2002, 166 pages.
NetOptics, Inc., Product Sheet, 1996, 1 page.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rieck, K., et al., "Botzilla: Detecting the 'Phoning Home' of Malicious Software," Proceedings of the ACM Symposium on Applied Computing (SAC), Sierre, Switzerland, 2010, 7 pages.
Rohde & Schwarz GmbH & Co. KG, "Accessnet-T, DMX-500 R2, Digital Mobile eXchange," Product Brochure, Secure Communications, Mar. 2000, 4 pages.
Rohde & Schwarz GmbH & Co. KG, "Accessnet-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Saltaformaggio, B., et al., "Eavesdropping on Fine-Grained User Activities Within Smartphone Apps Over Encrypted Network Traffic," Proceedings of the $10^{th}$ Usenix Conference on Offensive Technologies (WOOT'16), 2016, pp. 69-78.
Sandvine Inc., "Policy Control for Connected and Tethered Devices," 2015, 11 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.
Wang, H., et al., "NetSpy: Automatic Generation of Spyware Signatures for NIDS," Proceedings of the $22^{nd}$ Annual Computer Security Applications Conference, Miami Beach, Florida, Dec. 2006, 10 pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.
Zakin, O., et al., "Identifying Computers Hidden Behind a NATusing Machine Learning Techniques," $6^{th}$ European Conference on Information Warfare and Security (ECIW), Shrivenham, United Kingdom, Jul. 2007, 2 pages.
Zhang, Y., et al., "Detecting Stepping Stones," Proceedings of the $9^{th}$ Usenix Security Symposium, Denver, Colorado, 2000, 11 pages.

\* cited by examiner

| Time | SrcIP | DstIP | Size |
|---|---|---|---|
| 1522753877.004147 | 10.0.20.128 | 212.199.140.162 | 8024 |
| 1522753877.004831 | 10.0.20.128 | 212.199.140.162 | 8024 |
| ⋮ | ⋮ | ⋮ | ⋮ |
| 1522753892.734925 | 10.0.20.128 | 212.199.140.162 | 3922 |
| ⋮ | ⋮ | ⋮ | ⋮ |
| 1522755555.014589 | 212.199.140.162 | 109.65.90.65 | 8030 |
| 1522755555.015232 | 212.199.140.162 | 109.65.90.65 | 8030 |
| ⋮ | ⋮ | ⋮ | ⋮ |
| 1522755572.145999 | 212.199.140.162 | 109.65.90.65 | 3925 |
| ⋮ | ⋮ | ⋮ | ⋮ |

SYSTEM AND METHOD FOR IDENTIFYING EXCHANGES OF ENCRYPTED COMMUNICATION TRAFFIC

FIELD OF THE DISCLOSURE

The present disclosure relates to the monitoring of communication traffic generated by users of computer applications.

BACKGROUND OF THE DISCLOSURE

Many computer applications use encrypted protocols, such that the communication traffic exchanged by these applications is encrypted. Examples of such applications include WhatsApp, Skype, Line, and Dropbox. Examples of encrypted protocols include the Secure Sockets Layer (SSL) protocol and the Transport Layer Security (TLS) protocol.

US Patent Application Publication 2016/0285978, whose disclosure is incorporated herein by reference, describes a monitoring system that monitors traffic flows exchanged over a communication network. The system characterizes the flows in terms of their temporal traffic features, and uses this characterization to identify communication devices that participate in the same communication session. By identifying the communication devices that serve as endpoints in the same session, the system establishes correlations between the users of these communication devices. The monitoring system characterizes the flows using traffic features such as flow start time, flow end time, inter-burst time and burst size, and/or statistical properties of such features. The system typically generates compressed-form representations ("signatures") for the traffic flows based on the temporal traffic features, and finds matching flows by finding similarities between signatures.

SUMMARY OF THE DISCLOSURE

There is provided, in accordance with some embodiments of the present disclosure, a system including a data storage and a processor. The processor is configured to posit, by analyzing encrypted communication traffic passed over multiple connections without decrypting the traffic, that at least one file was transferred over one connection of the connections. The processor is further configured to group packets belonging to the connection into at least one sequence, in response to the positing. The processor is further configured to compute an estimated size of the file, based on respective sizes of those of the packets belonging to the sequence, and to store the estimated size in the data storage.

In some embodiments, the processor is configured to posit that the file was transferred over the connection in response to identifying, in one of the packets, an identifier of a server known to service file exchanges.

In some embodiments, the identifier is an Internet Protocol (IP) address.

In some embodiments, the processor is configured to posit that the file was transferred over the connection in response to an indication in one of the packets or in another packet that the connection was made by an application used for file transfers.

In some embodiments, the indication includes a specification of a protocol used by a class of applications used for file transfers.

In some embodiments, the processor is configured to group the packets by demarcating between the sequence and others of the packets that were communicated in the same direction as was the sequence.

In some embodiments, the processor is configured to demarcate between the sequence and the others of the packets based on a time gap between the sequence and a closest one of the others of the packets.

In some embodiments, the processor is configured to demarcate between the sequence and the others of the packets based on a decrease in throughput at an end of the sequence.

In some embodiments, the processor is configured to compute the estimated size of the file by:
computing a sum of the respective sizes, and
computing the estimated size of the file by dividing the computed sum by a predefined packet-size inflation divisor that is greater than one.

In some embodiments, the predefined packet-size inflation divisor is expressed as a probability distribution, such that the processor is configured to compute the estimated size as another probability distribution.

In some embodiments,
the sequence was downloaded by a client, and
the processor is further configured to, prior to computing the estimated size of the file:
identify another sequence of other packets downloaded by the client,
compute another sum of respective sizes of the other packets,
posit that the other sequence carried another file having a known size, and
in response to the positing, compute the packet-size inflation divisor by dividing the other sum by the known size.

In some embodiments, the processor is further configured to posit that the other file was downloaded by multiple other clients, and the processor is configured to posit that the other sequence carried the other file in response to a number of the other clients.

In some embodiments, the processor is further configured to communicate the other file to the client, such as to cause the other sequence to be downloaded by the client.

In some embodiments, the sequence was exchanged between a server and a client, and the processor is further configured to, prior to computing the estimated size of the file:
infer one or more parameters from one or more of the connections belonging to the client, and
select the packet-size inflation divisor from multiple predefined inflation divisors, based on a predefined association between the packet-size inflation divisor and the parameters.

In some embodiments, at least one of the parameters is selected from the group of parameters consisting of: a type of the client, an operating system running on the client, and an encryption protocol used by the client.

In some embodiments,
the sequence was uploaded by a client, and
the processor is further configured to, prior to computing the estimated size of the file:
identify, with respective levels of confidence, instances in which respective other files were communicated from the client to respective other clients, and
based on the identified instances and on a predefined distribution of another packet-size inflation divisor for downloads, compute the packet-size inflation divisor.

There is further provided, in accordance with some embodiments of the present disclosure, a method including, by analyzing encrypted communication traffic passed over multiple connections without decrypting the traffic, positing that at least one file was transferred over one connection of the connections. The method further includes, in response to the positing, grouping packets belonging to the connection into at least one sequence. The method further includes computing an estimated size of the file, based on respective sizes of those of the packets belonging to the sequence, and storing the estimated size in a database.

There is further provided, in accordance with some embodiments of the present disclosure, a computer software product including a tangible non-transitory computer-readable medium in which program instructions are stored. The instructions, when read by a processor, cause the processor to posit, by analyzing encrypted communication traffic passed over multiple connections without decrypting the traffic, that at least one file was transferred over one connection of the connections. The instructions further cause the processor to group packets belonging to the connection into at least one sequence, in response to the positing. The instructions further cause the processor to compute an estimated size of the file, based on respective sizes of those of the packets belonging to the sequence, and to store the estimated size in a database.

There is further provided, in accordance with some embodiments of the present disclosure, a system including a peripheral device and a processor. The processor is configured to compute a measure of similarity between (i) a first estimated size of first encrypted file content transferred over a network and (ii) a second estimated size of second encrypted file content transferred over the network. The processor is further configured to posit, based on the measure of similarity, that the first encrypted file content and the second encrypted file content represent the same file. The processor is further configured to generate an output to the peripheral device in response to the positing.

In some embodiments, the peripheral device is selected from the group of devices consisting of: a display, and a data storage.

In some embodiments, the first estimated size and the second estimated size are expressed as respective probability distributions.

In some embodiments,
the first encrypted file content was uploaded by a first user at a first time,
the second encrypted file content was downloaded by a second user at a second time subsequent to the first time,
the processor is further configured to compute a difference between the second time and the first time, and
the processor is configured to generate the output responsively to the difference being less than a predefined threshold.

In some embodiments, the output indicates that the first user communicated the file to the second user.

In some embodiments, the processor is configured to generate the output by increasing a relatedness score between the first user and the second user.

In some embodiments,
the first encrypted file content was downloaded by a first user at a first time,
the second encrypted file content was downloaded by a second user at a second time subsequent to the first time,
the processor is configured to generate the output in response to a metadata link having been communicated by the first user between the first time and the second time, and
the output indicates that the metadata link pointed to the file and was communicated to the second user.

In some embodiments, the output indicates that a first user communicated the file to a second user, and the processor is configured to generate the output in response to a relatedness score between the first user and the second user.

In some embodiments, the processor is further configured to identify a frequency with which files having the first estimated size are communicated over the network, and the processor is configured to posit that the first encrypted file content and the second encrypted file content represent the same file with a likelihood that decreases with the frequency.

In some embodiments,
the first encrypted file content was downloaded by a first user at a first time,
the second encrypted file content was downloaded by a second user at a second time,
the processor is further configured to compute a difference between the first time and the second time, and
the processor is configured to generate the output responsively to the difference being less than a predefined threshold.

In some embodiments, the processor is further configured to:
receive a query specifying a second-file-content transfer of the second encrypted file content, and
identify a first-file-content transfer of the first encrypted file content in response to the query,
the processor is configured to compute the measure of similarity in response to identifying the first-file-content transfer, and
the output includes parameters of the first-file-content transfer.

In some embodiments,
the second-file-content transfer was performed using a class of applications, and
the processor is configured to identify the first-file-content transfer of the first encrypted file content by:
retrieving, from a database, multiple other-file-content transfers of other encrypted file content, which were performed using the class of applications, and
identifying the first-file-content transfer from among the other-file-content transfers.

In some embodiments, the processor is further configured to:
identify multiple other-file-content transfers of other encrypted file content in response to the query, and
posit that the file was transferred in each of the other-file-content transfers, and
the processor is configured to generate the output by outputting a timeline of the other-file-content transfers and the first-file-content transfer.

In some embodiments, at least some of the other-file-content transfers were performed using different respective applications.

There is further provided, in accordance with some embodiments of the present disclosure, a method including computing a measure of similarity between (i) a first estimated size of first encrypted file content transferred over a network and (ii) a second estimated size of second encrypted file content transferred over the network. The method further includes, based on the measure of similarity, positing that the first encrypted file content and the second encrypted file content represent the same file, and in response to the positing, generating an output.

There is further provided, in accordance with some embodiments of the present disclosure, a computer software product including a tangible non-transitory computer-readable medium in which program instructions are stored. The instructions, when read by a processor, cause the processor to compute a measure of similarity between (i) a first estimated size of first encrypted file content transferred over a network and (ii) a second estimated size of second encrypted file content transferred over the network. The instructions further cause the processor to posit, based on the measure of similarity, that the first encrypted file content and the second encrypted file content represent the same file, and to generate an output in response to the positing.

The present disclosure will be more fully understood from the following detailed description of embodiments thereof, taken together with the drawings, in which:

DETAILED DESCRIPTION OF EMBODIMENTS

Glossary

Figure 1:
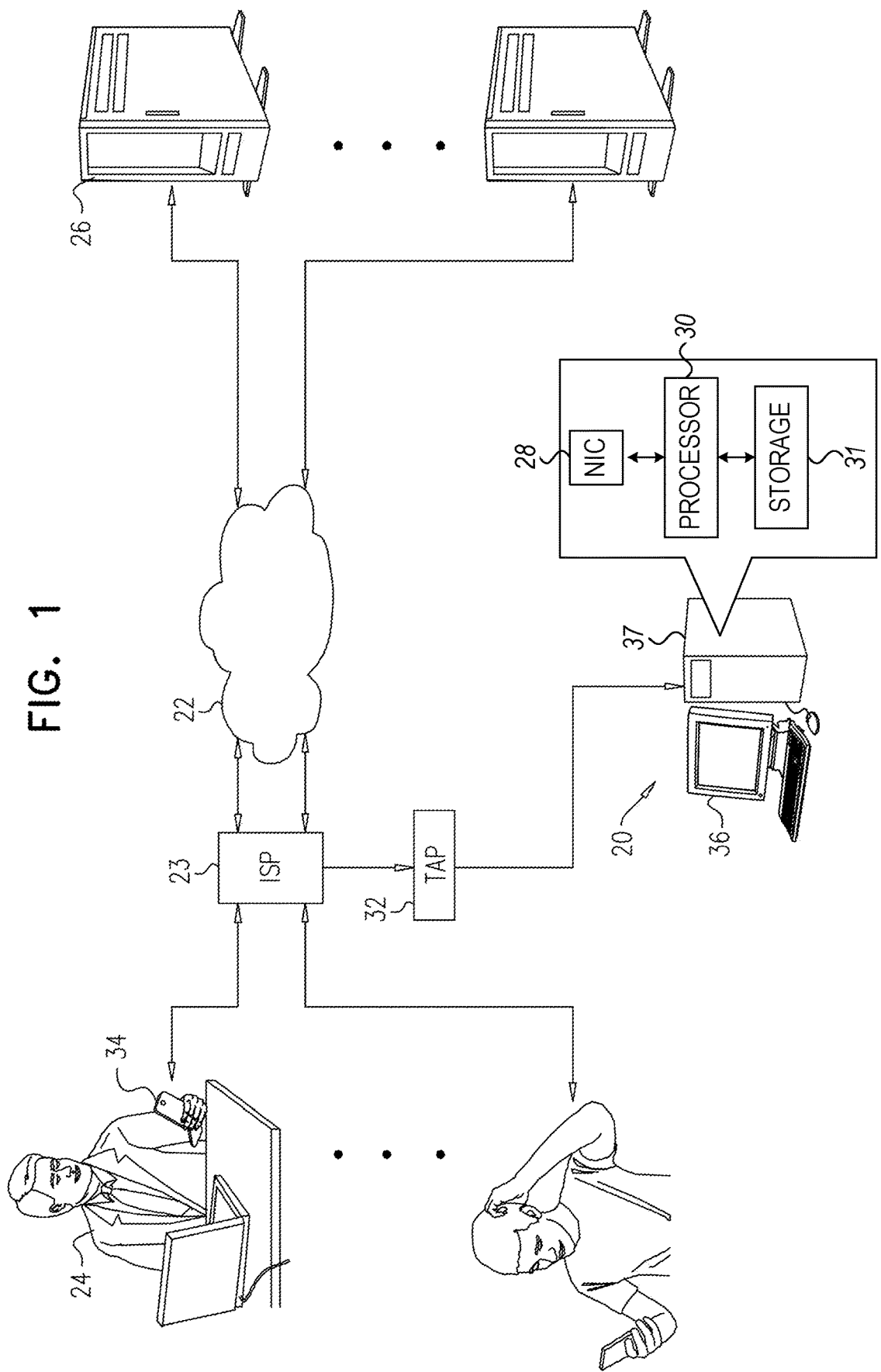
FIG. 1 is a schematic illustration of a system for monitoring communication exchanged over a network, in accordance with some embodiments of the present disclosure.

In the context of the present application, including the claims, a file is said to be "exchanged" if the file is passed from a first user to a second user, regardless of whether the second user passes any communication to the first user. If the exchange is performed via a server, the file is said to be transferred to the server by the first user, and then transferred to the second user by the server.

In the context of the present application, including the claims, an "original distributor" of any given file is the first user to communicate the file to another user. In some cases, the original distributor is the first user to communicate the file to another user using a particular application, even if the file was previously communicated using a different application. For example, in the event that User A created a file and then passed the file to User B over Skype, and User B subsequently passed the file to User C over WhatsApp, both User A and User B may be referred to as original distributors of the file: User B as the original distributor over WhatsApp, and User A as the "global" original distributor.

In the context of the present application, including the claims, a processor is said to "posit" a particular hypothesis if the processor computes a relatively significant likelihood, or level of confidence, that the hypothesis is true. In general, a "relatively significant" likelihood is any likelihood that exceeds a particular predefined threshold. (The threshold may be defined as an absolute number, or as a particular percentile or other statistical measure of a distribution of likelihoods.) In the context of the present application, including the claims, multiple mutually-exclusive hypotheses may be simultaneously posited with different respective likelihoods.

For example, using the techniques described herein, a processor may identify several candidate original distributors of a particular file, i.e., several users who have a sufficiently high likelihood of being the original distributor of the file. In this case, it may be said with reference to each of these users that the processor "posits" that the user is the original distributor of the file.

In the present application, including the claims, words such as "identify" and "ascertain" may be used interchangeably with "posit."

In the context of the present application, including the claims, the process of "calculating" or "estimating" a particular quantity may include, within its scope, calculating a range or probability distribution for the quantity.

In the context of the present application, including the claims, the terms "user," "client," and "device" may be used interchangeably in certain contexts. For example, with reference to a particular upload of a file, it may be said that the user uploaded the file, or that the device or client used by the user uploaded the file.

In the context of the present application, including the claims, one file transfer is said to "correspond" to another file transfer if the two transfers are of the same file. A specific type of correspondence is "strong correspondence." In the context of the present application, including the claims, two file transfers are said to "strongly correspond" to one another if the two transfers belong to the same instance of communication of the file. As an example, in a scenario in which a first user communicates a file to a second user via a server, the upload of the file by the first user and the download of the file by the second user are said to strongly correspond to one another. As another example, in a scenario in which one user communicates a file to multiple other users in a single instance of communication (e.g., by communicating the file to a group including the multiple other users), the respective downloads of the file by the other users are said to strongly correspond to each another (as well as to the upload of the file).

Overview

Embodiments of the present disclosure provide techniques for identifying sequences of encrypted packets that carry files between clients and application servers, and for estimating the sizes of these files. Advantageously, these techniques require only passive monitoring of the communication that is exchanged with the application servers, and do not require any decryption of the encrypted packets.

To perform these techniques, a traffic-monitoring system first searches the traffic for connections that appear to carry file content. Subsequently to identifying such a connection, the system estimates the number of files that were transferred over the connection. To perform this estimation, the system may interpret a change in the direction of packet flow as indicating the end of a file. Thus, for example, one or more uploaded packets situated between two sequences of downloaded packets may indicate that the two sequences of downloaded packets carry different respective files. Alternatively or additionally, the system may interpret a duration between successive packets that exceeds a predefined threshold as an indicator of the end of one file and the beginning of another. Alternatively or additionally, the system may interpret a drop in throughput as indicating the end of a file. Alternatively or additionally, the system, using machine-learned techniques, may identify patterns in the timing, sizes, and/or directions of the packets that indicate the end of one file and the beginning of another. Alternatively or additionally, the system, using machine-learned techniques, may identify, on a parallel connection between the two parties (such as a connection that carries control messages), a message that indicates the end of one file and/or the beginning of another.

Next, the system estimates the respective sizes of one or more of the files that were transferred over the connection. To perform this estimation, the system first "peels away" as many lower-level protocol headers (e.g., Transmission Control Protocol (TCP) headers, IP headers, and SSL headers) as possible from each of the packets that carries part of the file, and identifies the size that is specified (in an unencrypted manner) in the lowest-level payload that remains. Next, the system tallies the specified sizes. Finally, the system reduces the packet-size tally to account for an estimated overhead due to the encryption of the packets.

More specifically, as the present inventors have observed, an encrypted packet that carries file content is generally larger than the file content. The amount of "inflation" of the packet is generally a function of various factors, such as the type of device that uploads or downloads the file, the operating system running on the device, and the encryption protocol that is used to encrypt the packet. For example, when a particular device uploads a file having an unencrypted size of S bytes, the packets carrying the file may have a total size of $S*(1+x)$ bytes, where x is an inflation percentage for uploads. Similarly, when the device downloads a file having an unencrypted size of S bytes, the packets carrying the file may have a total size of $S*(1+y)$ bytes. (x and y are generally different from one another, and may change from time to time.) Hence, to estimate the size of a given file, the system first looks up or estimates x or y, and then divides the packet-size tally by $1+x$ or $1+y$. (The quantities $1+x$ and $1+y$ are referred to below as "packet-size inflation divisors.")

In some cases, the system may learn the inflation percentages for a particular device of interest, by exchanging files of known sizes with the device of interest. (This exchange may be performed silently, such that the user of the device of interest is unaware of the file exchanges.) Subsequently, given an encrypted file transfer performed by the device of interest, the system may compute the estimated size of the file using the relevant learned inflation percentage.

Alternatively or additionally, the system may learn the inflation percentages for various different device types, operating systems, and encryption protocols of interest. Subsequently, given a file-carrying sequence of packets exchanged with a particular device, the system may ascertain, from the sequence of packets (and/or from other packets exchanged with the device), the device type, the operating system run by the device, and/or the encryption protocol that was used to generate the sequence. The system may then look up the inflation percentage corresponding to these parameters.

In some embodiments, subsequently to identifying multiple file-carrying packet sequences as described above, the system may posit that two or more of the sequences correspond to each other by virtue of carrying the same file. This positing may be based on the times at which the sequences were communicated, the estimated sizes of the files carried by the sequences, and/or knowledge of prior communication between the relevant devices or users.

For example, using the techniques described above, the system may ascertain that User A downloaded first file content, having a first estimated size, from a particular server and that, at a previous time, User B uploaded second file content, having a second estimated size, to the server. If the two estimated sizes are sufficiently close to one another, the system may posit that the first file content and second file content represent the same file. In response thereto—particularly if User A's download began shortly after the end of User B's upload, and/or if the two users previously communicated with one another—the system may posit that User B communicated the file to User A via the server. Furthermore, if the system also posits that one or more other users downloaded the same file at approximately the same time as User A, the system may posit that the other users belong to the same communication group or distribution list as does User A.

Alternatively or additionally, based on corresponding uploads and downloads, the system may calculate a more accurate estimate of the inflation percentage for a particular device. For example, the system may identify multiple file uploads performed by the device, and may further identify various file downloads that appear to correspond, respectively, to these uploads (i.e., that appear to carry the files that are carried by the uploads, respectively). By comparing the upload packet-size tallies to the download packet-size tallies, the system may estimate the upload inflation percentage for the device. This estimate may then be refined over time, based on further observations of file exchanges.

Alternatively or additionally, based on an identified upload, by a particular user, that is not preceded by any downloads of a similarly-sized file, the system may posit that the particular user is the original distributor of the file. This information may be particularly useful in the event that the file contains illegal or malicious content.

System Description

Reference is initially made to FIG. 1, which is a schematic illustration of a system 20 for monitoring encrypted communication exchanged over a network 22, such as the Internet, in accordance with some embodiments of the present disclosure.

FIG. 1 depicts a plurality of users 24 using computer applications to transfer files over network 22. For example, users 24 may exchange files using email applications, file transfer protocol (FTP) applications, messaging applications, gaming applications, or chat room applications. As another example, one user may upload a file to a website, such as an online storage or file-transfer site, and another user may then download the file from the website. The applications used for transferring files may run on any suitable devices (or "clients"), such as personal computers or mobile devices 34.

A plurality of servers 26 service the computer applications, such that the files are transferred via servers 26. (Any given server may service more than one application.) In some cases, a file may be exchanged between two users via more than one server. For example, the emailing of a file from a first user to a second user may comprise (i) the uploading of the file from the first user's device to the first user's email server, (ii) the communication of the file from the first user's email server to the second user's email server, and (iii) the downloading of the file from the second user's email server to the second user's device.

Typically, system 20 passively monitors the communication over network 22, in that the system does not intermediate the exchange of communication traffic between users 24 and servers 26, but rather, receives copies of the traffic from at least one network tap 32. Network tap 32 may be situated, for example, near an Internet Service Provider (ISP) 23, and ISP 23 may mirror the traffic to the network tap.

Communication traffic over network 22 is exchanged in units of packets. Although the content of these packets may be encrypted, a packet may include certain unencrypted metadata, such as a specification of the communication protocols (e.g., the TCP protocol) used to construct the packet, a source IP address and/or port, a destination IP address and/or port, and the size of the packet at various layers. As described in detail below, system 20 uses this information to identify connections in which files are transferred, and to estimate the sizes of these files.

Although the traffic generally does not explicitly indicate the identities of the users, the system may use external sources of information to discover these identities. The system may thus, subsequently to identifying the transfer of a file, identify the user who performed the transfer.

For example, the system may receive, from a cellular service provider, a first mapping between IP addresses and mobile phone numbers (derived, for example, from General Packet Radio Service Tunneling Protocol (GTP) data), along with a second mapping between mobile phone numbers and users' names. Using these mappings, the system may use a specified source or destination IP address to identify the user who sent or received a particular file. Alternatively, for example, to identify the user who is using a particular IP address, the system may identify unencrypted communication in which the user's email address is associated with the IP address, and then search the Internet for a user profile in which the user's email address is associated with the user's name.

In some cases, a device may use a network address translator (NAT), which allows multiple devices to use a single IP address. In such cases, the system may not be able to infer the user's identity from the IP address as described above. However, the system may nonetheless infer the user's identify from unencrypted identifying information contained in another connection belonging to the same device as does the connection in which the file was transferred. To ascertain that the two connections belong to the same device, the system may, for example, use any of the techniques described in US Patent Application Publication 2017/0222922, whose disclosure is incorporated herein by reference. For example, the system may group the two connections together based on common usage characteristics exhibited by the two connections.

System 20 comprises a network interface 28, such as a network interface controller (NIC), a processor 30, and one or more peripheral devices, such as a display 36, a data storage 31 (e.g., a hard drive or a flash memory), and/or one or more input devices (e.g., a keyboard or a mouse) to facilitate interaction with the system. In some embodiments, all of the aforementioned components belong to a single server 37. In other embodiments, the components are distributed over multiple servers 37. Each of the peripheral devices may be internal or external to the server to which it belongs.

In general, the packets from network tap 32 are received by processor 30 via network interface 28. Processor 30 processes the packets, as described herein, such as to identify file transfers and/or to perform any other relevant function described herein. Further to processing a collection of packets, the processor may generate any suitable output to one or more of the peripheral devices. For example, the processor may generate a visual output to display 36. Alternatively or additionally, the processor may store information (e.g., in any one of the databases described hereinbelow) in storage 31.

In general, processor 30 may be embodied as a single processor, or as a cooperatively networked or clustered set of processors. For example, a first processor may receive communication traffic via network interface 28 and, based on the traffic, generate and store a network-traffic report, which is described below with reference to FIG. 3. Subsequently, or while the network-traffic report is continually updated by the first processor, a second processor may identify file transfers from the network-traffic report, and store information relating to the file transfers in data storage 31. The second processor may further process this information to identify corresponding file transfers; alternatively, this function may be performed by yet another processor.

In some embodiments, the functionality of processor 30, as described herein, is implemented solely in hardware, e.g., using one or more Application-Specific Integrated Circuits (ASICs) or Field-Programmable Gate Arrays (FPGAs). In other embodiments, the functionality of processor 30 is implemented at least partly in software. For example, in some embodiments, processor 30 is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Identifying File Exchanges and Original Distributors

Figures 2, 3:
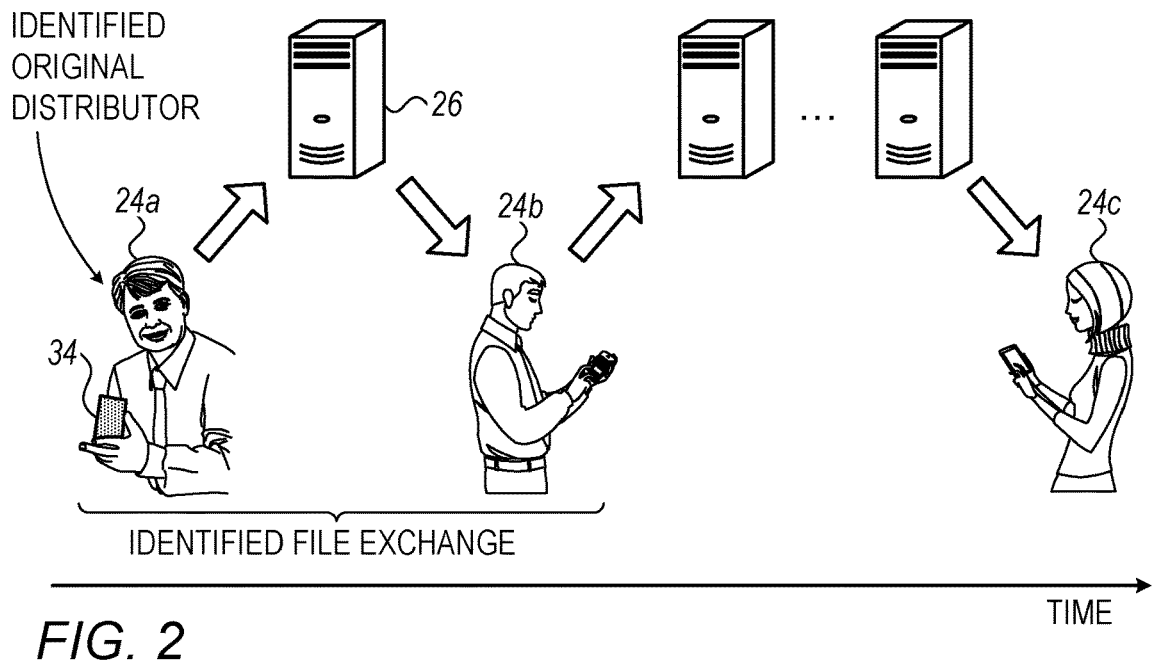
FIG. 2 is a schematic illustration of a series of file exchanges that may be identified in accordance with some embodiments of the present disclosure.
FIG. 3 is a schematic illustration of a method for identifying file transfers, in accordance with some embodiments of the present disclosure.

Reference is now made to FIG. 2, which is a schematic illustration of a series of file exchanges that may be identified in accordance with some embodiments of the present disclosure.

FIG. 2 depicts a first user 24a communicating a file to a second user 24b via a server 26. In particular, first user 24a uploads the file to the server, and the server subsequently communicates the file to the device of second user 24b, such that the second user's device downloads the file from the server.

As further shown in FIG. 2, subsequently to downloading the file, second user 24b may forward the file to one or more or other users. For example, second user 24b may upload the file to the server, and the server may then communicate the file to the other users. Alternatively, instead of uploading the file itself, the second user's device may send, to the server (or to a cooperatively networked server that handles non-file-bearing traffic), a metadata link to the file. The server may then verify that the file, which was already received from the first user, is cached locally. If yes, the server may communicate the file to the other users. As yet another alternative, the second user, using a different application from that which was used by first user 24a, may upload the file to another server, and the other server may then communicate the file to the other users. Eventually, after any number of such exchanges, the file is downloaded by a third user 24c.

As described in detail below, by analyzing the encrypted traffic that is generated in such a scenario, system 20 (FIG. 1) may identify information of interest, and may generate any suitable output (e.g., a visual output displayed on display 36 (FIG. 1)) indicating this information. For example, the system may first identify that the second user's device downloaded a file, using the techniques described below in the subsection entitled "Identifying a file transfer." The system may further identify the second user, based on an IP address and/or other information contained in the traffic and/or any relevant external data sources, such as a GTP data source. Subsequently, the system may estimate the size of the file, using the techniques described below in the subsection entitled "Estimating the file sizes." The processor may further identify that the first user uploaded a similarly-sized file shortly before the second user's download. Based on this information and/or other factors described below, the processor may posit that the first user communicated the file to the second user.

In response to positing that the first user communicated the file to the second user, the system may increase a relatedness score for the pair of users, as described below in the subsection entitled "Example algorithms." This score quantifies the extent to which the pair of users are assumed to communicate with one another. The relatedness score may also be increased in response to identifying other types of communication or interaction between the users, such as any of the types of communication (e.g., the exchange of text messages) described in US Patent Application Publication 2018/0316638, whose disclosure is incorporated herein by reference. Alternatively or additionally, the relatedness score may be increased in response to the users living or working at the same address or near one another.

Similarly, using the same techniques for identifying file transfers and estimating file sizes, the system may posit that another user (not shown in FIG. 2) downloaded the file at approximately the same time as second user 24b, indicating that the other user and second user 24b might belong to the same group or distribution list. In response thereto, the system may increase the relatedness score for second user 24b and the other user, alternatively or additionally to increasing the relatedness score for first user 24a and the other user.

In addition to calculating relatedness scores for various pairs of users, the system may posit that a particular user is the original distributor of a particular file of interest. In other words, the system may identify the particular user as a candidate original distributor of the file. In response thereto, the system may generate an output indicating the likelihood that this user is the original distributor of the file.

For example, if the file downloaded by third user 24c is deemed to be of interest (e.g., if the file is found to contain illegal or malicious content), the system may track the successive exchanges of the file going backward in time, until first user 24a is identified as a candidate original distributor of the file. In other words, the system may identify one or more users who may have forwarded the file to the third user, then one or more users who may have forwarded the file to these latter users, and so forth, until first user 24a (in addition to any other candidate original distributors) is reached.

Alternatively or additionally to explicitly identifying candidate original distributors of a file, the system may output a timeline of the file transfers, as further described below with reference to FIG. 7. A user may then identify any candidate original distributors by referring to the timeline.

It is emphasized that the system may posit an original distributor or output a timeline as described above even if the series of file transfers occurs across multiple different applications. For example, even if the first user communicates the file to the second user using Skype, while the third user receives the file over WhatsApp, the system may nonetheless identify the first user as a candidate original distributor of the file.

In some cases, the actual original distributor of the file may be indeterminable from the traffic, such as where the original distributor used Virtual Private Network (VPN) tunneling or another tunneling protocol, or where the original distributor used an ISP that is outside the coverage of system 20. Even in such cases, however, other techniques may be used to link one or more of the candidate original distributors, as identified by the system, to the actual original distributor.

Identifying File Transfers

Reference is now made to FIG. 3, which is a schematic illustration of a method for identifying file transfers, in accordance with some embodiments of the present disclosure.

FIG. 3 depicts an example network-traffic report 38, which specifies various properties of at least some of the encrypted packets that are received by system 20 via network tap 32. Report 38 may be constructed by processor 30 using any suitable software, such as the Wireshark open source software. It is noted that report 38 typically combines traffic generated by multiple different applications, such as the top five, ten, fifty, or hundred applications used to transfer files between users.

As shown in FIG. 3, for each packet that is included in report 38, the report typically specifies the time at which the packet was received by the network tap, the source Internet Protocol (IP) address (SrcIP) and destination IP address (DstIP) specified in the packet (and/or the domain names to which the SrcIP and DstIP correspond), and the size of the packet. (In FIG. 3, the time is indicated in the Unix time format, while the size is indicated in bytes.) Typically, the report includes additional properties of each packet, such as the source and destination port numbers, and the protocol(s) used to construct the packet.

By way of example, FIG. 3 shows a first sequence of packets S1 in which a file is uploaded to a server having IP address 212.199.140.162, and a second sequence of packets S2 in which a file is downloaded from the server. Although a file-carrying sequence of packets typically includes tens, hundreds, or thousands or packets, FIG. 3, for ease of illustration, shows only the first two packets and the last packet of each sequence. Also for ease of illustration, FIG. 3 does not show any other packets interspersed with the packets belonging to sequences S1 and S2.

Typically, prior to processing report 38 so as to identify sequences of packets that carry files, the processor preprocesses the report. For example, the processor may reorder packets that were received out of order by tap 32 due to TCP reconstruction or retransmission. (This may be done, for example, based on the TCP sequence numbers specified in the packets.) The processor may also filter out packets whose sizes are below a particular threshold, or are otherwise known a priori not to carry file content. Examples of such packets include keepalive and negotiation packets.

In some embodiments, the processor also separates the report into two separate sub-reports: one sub-report including only uploaded packets, and the other sub-report including only downloaded packets. The processor then processes each sub-report separately. (Thus, the processor may first identify first sequence S1 by processing the sub-report for uploads, and then identify sequence S2 by processing the sub-report for downloads.) In other embodiments, the processor does not separate the uploaded packets from the downloaded packets. In yet other embodiments, the processor performs the processing techniques described below for the full, unseparated report 38, and also for the separate sub-reports. Advantageously, this may facilitate a more accurate identification of file transfers.

Following the preprocessing of report 38, the processor scans the report (or the separated sub-reports) for possible file transfers. In performing this scan, the processor identifies each connection for which there is an indication that the connection was used, or at least may have been used, for a file transfer. In response to identifying this indication, the processor posits that the connection carries at least one file, even if the processor cannot identify the particular application used to make (or "open") the connection.

For example, the processor may posit that a connection carries at least one file in response to identifying, in a packet belonging to the connection, an identifier, such as an IP address or a certificate, of a server known to service file exchanges. Thus, for example, the packets in sequences S1 and S2 may be identified as file-carrying packets based on the fact that the IP address 212.199.140.162, which is known to service file content, is specified in these packets. The identifiers of servers that handle file content—and, optionally, the applications serviced by these servers—may be learned from Domain Name System (DNS) requests, Hypertext Transfer Protocol Secure (HTTPS) certificate negotiations, and/or any other relevant type of traffic.

For example, the processor may identify an identifier of a messaging-application server that is known by the processor to exclusively handle file content. Alternatively, the processor may identify an identifier of a server, such as a file-storage server or an email server, that is known by the processor to service a particular application or class of applications used exclusively or non-exclusively for file transfers.

In some cases, the processor posits that a connection carries at least one file in response to an indication that the connection was made by an application used for file transfers. This indication may be contained in one of the packets belonging to the connection, or in another packet belonging to another connection sharing the same source and destination IP addresses with the connection in question. The indication may include an identifier of a server, as described immediately above. Alternatively, the indication may include a layer 7 (i.e., an application-layer) specification of an application protocol known to be used by a class of applications used exclusively or non-exclusively for file transfers. For example, a specification of the Simple Mail Transfer Protocol (SMTP), a version of the Post Office Protocol (POP), or another clear email exchange protocol may indicate that the connection was made by an email application.

In some cases, identifying the aforementioned indication or server-identifier may not be sufficient for positing that the connection carries at least one file, due to the relatively low likelihood of this hypothesis. For example, identifying that an email application was used to make the connection may not be sufficient for positing that the connection carries at least one file, given that most emails do not carry files. Hence, the processor typically learns, using any suitable machine learning techniques, other properties of connections that indicate that a file transfer may have been performed. Subsequently, in response to identifying one or more of these properties (and in some cases, even without identifying the aforementioned indication or server-identifier), the processor may posit that the connection carries at least one file.

For example, the processor may posit that the connection carries at least one file in response to statistical properties of the packets belonging to the connection, such as a ratio of uploaded packets to downloaded packets. Alternatively or additionally, the processor may identify a relatively high throughput (i.e., a throughput exceeding a predefined threshold) as an indication of a possible file transfer.

Alternatively or additionally, the processor may posit that the connection carries at least one file in response to identifying, in another connection, an exchange of packets indicating that the former connection carries at least one file. For example, when some messaging applications are used to exchange a file, two connections are opened: a first connection to a first server, over which the file is transferred, and a second connection to a second server, over which related messages, such as a message describing the file or acknowledging the transfer, are exchanged. Hence, subsequently to identifying that a first connection was made by a messaging application used for file transfers, the processor may identify a second connection made by the same application and occurring at approximately the same time as, and sharing the same device IP address as, the first connection. The processor may further identify an exchange of packets in the second connection that appears to be related to a file transfer. In response thereto, the processor may posit that the first connection carries at least one file.

For each connection posited to carry a file, the processor groups the packets belonging to the connection into one or more packet sequences, each of which is posited to carry a different respective file. For each sequence, the processor calculates an estimated size of the file assumed to be carried by the sequence. Subsequently, relevant properties of the sequence are stored in a file-transfer database, as further described below with reference to FIG. 4. (In some cases, such as cases in which the processor is not certain that the sequence carried a file, the processor may store the properties of the sequence only if the size of the sequence exceeds a predefined threshold.)

To group the packets belonging to the connection, the processor typically looks for features of the packets indicating the beginning or end of a file transfer. Based on these features, the processor demarcates each sequence of packets that is assumed to be carrying a respective file.

For example, if both uploaded and downloaded packets are processed together, the processor may identify an uploaded packet that immediately follows a large number of downloaded packets. In response thereto, the processor may posit that the last of the downloaded packets is the last packet of a downloaded file-carrying sequence. Similarly, the processor may identify the end of an uploaded file-carrying sequence by identifying a downloaded packet that immediately follows a large number of uploaded packets.

One example of a packet that signifies the end of a file transfer is an "end of file" (EOF) acknowledgement message. Using machine-learning techniques, the processor may learn to identify this type of message, and hence, to identify the end of a file transfer. (Based on the identified EOF acknowledgement messages, the processor may learn the statistical properties of the time gaps between the transfer of different respective files, which may be used to demarcate file-transfer sequences as described immediately below.)

Alternatively or additionally, the processor may demarcate a sequence based on a time gap that precedes the sequence, and/or another time gap that follows the sequence. For example, if the duration between two consecutive packets exceeds a predefined threshold, the processor may assume that the first of these packets is the last packet in an earlier sequence carrying a first file, while the second of these packets is the first packet in a later sequence carrying a second file. The processor may define the threshold based on the statistical properties of the time gaps between the packets. For example, the threshold may be set to the mean time gap between consecutive packets plus a certain number of standard deviations.

For example, with reference to FIG. 3, the processor may demarcate between sequence S1 and a subsequent sequence of uploaded packets belonging to the same connection as sequence S1, by terminating sequence S1 at the first packet that precedes the closest succeeding packet by more than the threshold time gap. Similarly, the processor may demarcate between sequence S1 and a preceding sequence of uploaded packets belonging to the same connection as sequence S1, by beginning sequence S1 at the first packet that follows the closest preceding packet by more than the threshold time gap.

In many cases, towards the end of a file transfer, the throughput of the transfer decreases, in that the size of the packets decreases and/or the duration between successive packets increases relative to earlier portions of the file transfer. Subsequently, at the beginning of the next file transfer, the throughput increases to its previous level. Hence, alternatively or additionally to using the techniques described above, the processor may demarcate a sequence based on a decrease in throughput preceding the sequence, and/or another decrease in throughput exhibited at the end of the sequence.

For example, to demarcate sequence S1 from a subsequent file upload belonging to the same connection, the processor may identify several consecutive smaller packets, which are both preceded and followed by larger packets. In response to identifying this decrease in throughput, the processor may terminate sequence S1 at the last of the smaller packets, and begin the next sequence at the first subsequent larger packet. Alternatively, the processor may identify a downward trend in the size of the packets, followed by an upward trend in the size. In response thereto, the processor may terminate sequence S1 at the transition between the downward trend and the upward trend, i.e., at the local minimum in throughput.

Alternatively to using the throughput as a demarcator, the processor may use the throughput to set the threshold for the time gap, which in turn may be used to demarcate the sequence as described above. In particular, the threshold may be relatively high if the throughput is generally stable, but lower if the throughput exhibits a downward trend.

Alternatively or additionally, the processor may identify in the sizes and/or directions of the packets, and/or in the durations between the packets, a pattern that indicates the beginning or end of a file transfer. The processor may use any suitable machine-learning techniques to learn the patterns that indicate such transitions.

For example, as the present inventors have observed, a file-carrying sequence may include (i) an "N-packet pattern," which includes multiple consecutive sub-sequences of N packets each, where each of the sub-sequences includes N−1 packets of size SZ1 followed by a smaller residual packet of size SZ2, followed by (ii) a final sub-sequence that differs from the previous sub-sequences with respect to the number or size of the packets. Thus, in response to identifying a first N-packet pattern, followed by one or more middle packets, followed by a second N-packet pattern, the processor may terminate one sequence at the end of the middle packets (which are assumed to be the final sub-sequence of the sequence), and begin another sequence at the beginning of the second N-packet pattern. (The value of N for the second N-packet pattern is not necessarily the same as the value of N for the first N-packet pattern.)

For example, sequence S2 may include multiple sub-sequences of (for example) nine packets each, followed by a final packet of 3925 bytes. (Each of the sub-sequences may include, for example, eight packets of 8030 bytes each, followed by a ninth packet of 1561 bytes.) In response to observing this pattern, the processor may terminate sequence S2 at the final packet of 3925 bytes, thus demarcating sequence S2 from a subsequent file download over the same connection.

In some cases, the processor does not identify any features that appear to mark the beginning or end of a file transfer. In such cases, the processor may group all of the uploaded or downloaded packets in the connection into a single sequence.

In some cases, the processor may group the packets in a connection into multiple, mutually exclusive sets of sequences, i.e., the processor may group the packets in multiple different ways. In such cases, the processor may compute a level of confidence for each grouping, and then select the grouping with the highest level of confidence. The sequences per this grouping may then be stored in the aforementioned file-transfer database. Alternatively, the processor may store the sequences per each grouping, and then consider each grouping when processing any subsequent queries.

Estimating the File Sizes

Subsequently to extracting a sequence of packets from a connection as described above, the processor estimates the size of the file assumed to be carried by the sequence. To perform this estimation, the processor first "peels" the sequence of packets to the highest level possible, as described above in the Overview. The size of the remaining, unpeeled content of each packet (referred to below, for convenience, simply as "the size of the packet") is then treated as the size of the file content carried by the packet.

Next, the processor sums the respective sizes of the packets in the sequence. In some embodiments, the processor then returns this sum as the estimate of the size of the file. In other embodiments, to estimate the size of the file, the processor divides the aforementioned sum by a predefined packet-size inflation divisor that is greater than one. (Equivalently, it may be said that the processor multiplies the sum by a factor, equivalent to the inverse of the aforementioned divisor, that is less than one.) In such embodiments, prior to estimating the size of a given file, the processor—either before or after extracting the sequence of packets—computes the relevant packet-size inflation divisor.

In some embodiments, the processor computes the divisor for a particular downloading device by identifying another sequence of packets downloaded by the device, computing the sum $SUM\_0$ of the respective sizes of the packets in this sequence, positing that this sequence carried another file having a known size $SZ\_0$, and then computing the divisor by dividing $SUM\_0$ by $SZ\_0$.

For example, the processor may first, using the IP address of the downloading device as described above, look up the phone number or email address of the user of the downloading device. Subsequently, using the phone number or email address, the processor may communicate a test file, which has a known size, to the downloading device, so as to cause the downloading device to download a sequence of packets that carries the test file. The processor may then identify this sequence in report 38, and compute the total size of the sequence. The processor may then compute the divisor by dividing this size by the known size of the test file.

For example, it will be assumed that sequence S2 is downloaded by a device D2 having the IP address 109.65.90.65. It will further be assumed that the sum of the packet sizes in sequence S2 is SUM2. In such a case, to estimate the size of the file carried by sequence S2, the processor may first communicate a test file having a size of SZ_0 to device D2. The processor may then identify the sequence of packets carrying the test file, and compute the total size of this sequence as SUM_0. Subsequently, the processor may calculate the packet-size inflation divisor for downloads performed by device D2 as SUM_0/SZ_0. The processor may then estimate the size of the file carried by sequence S2 as SUM2/(SUM_0/SZ_0).

Alternatively, the processor may (e.g., using an external device, such as a mobile phone, that is controlled by the processor) download a particular file that appears to be viral. The processor may then ascertain the size SZ_0 of the apparently-viral file. Subsequently, by monitoring the encrypted traffic over network 22 and computing an estimated file size for each identified download, the processor may posit that the apparently-viral file was indeed downloaded by multiple other devices. (For example, each sequence of downloaded packets having a total size sufficiently close to SZ_0 may be posited to carry the apparently-viral file.) The processor may further ascertain that device D2 downloaded a sequence of packets having a total size SUM_0 that is similar to SZ_0. In response thereto, and in response to the number of other devices that were posited to have downloaded the file, the processor may posit that device D2 downloaded the file. (In other words, the processor may posit that device D2 downloaded the file with a likelihood that is an increasing function of the number of other devices that were posited to have downloaded the file.) Hence, the processor may calculate the divisor for downloads performed by device D2 as SUM_0/SZ_0.

Similarly, the processor may calculate the divisor for a particular uploading device by requesting that the uploading device communicate any test file to the processor. Subsequently to receiving the test file, the processor may ascertain the size SZ_0 of the test file, identify the corresponding sequence of packets uploaded by the uploading device and calculate the total size SUM_0 of this sequence, and then calculate the packet-size inflation divisor as the quotient of SUM_0 and SZ_0. Thus, for example, assuming that sequence S1 is uploaded by a device D1 having the IP address 10.0.20.128 and that the sum of the packets in sequence S1 is SUM1, the processor may (i) request that device D1 communicate any test file to the processor, (ii) ascertain the size SZ_0 of the test file, (iii) compute the total size SUM_0 of the uploaded sequence carrying the test file, (iv) calculate the packet-size inflation divisor for uploads performed by device D1 as SUM_0/SZ_0, and hence (v) estimate the size of the file carried by sequence S1 as SUM1/(SUM_0/SZ_0).

Alternatively, the processor may first learn the divisors for various different sets of file-transfer properties. Each divisor may then be stored in association with the set of properties to which the divisor corresponds. Subsequently, given a sequence of packets assumed to transfer a file, the processor may infer one or more properties of the assumed file transfer from the connection to which the sequence belongs and/or from other connections belonging to the same client. The processor may then select the appropriate divisor from the multiple predefined divisors that were stored, based on an association between this divisor and the properties.

Examples of relevant file-transfer properties include the type of client performing the transfer, the operating system running on the client, and the encryption protocol used by the client to perform the transfer. (In some embodiments, the operating system is identified from Hypertext Transfer Protocol (HTTP) headers that include a user agent.)

For example, with reference again to FIG. 3, the processor may initially construct a lookup table that specifies the divisor for uploaded files for various device types, operating systems, and encryption protocols. Subsequently, the processor may deduce (e.g., using the P0f TCP/IP stack fingerprinting tool) that sequence S1 was uploaded from a Samsung Galaxy S5 device running the Android 5.1.1 operating system, using the Transport Layer Security (TLS) protocol. The processor may then find the appropriate divisor for sequence S1 by looking up these parameters in the lookup table. Subsequently, the processor may estimate the size of the file carried by sequence S1, by dividing the total size of the sequence by the divisor.

Alternatively, the processor may compute the divisor for a particular device and for a particular file-transfer directionality, based on observing a large number of file exchanges in which the device performed a file-transfer with the file-transfer directionality. In particular, the processor may assume a particular distribution of the divisor (for the opposite directionality) for the other devices with which the file exchanges were performed, and, based on the distribution, compute the divisor for the device.

For example, to compute the divisor for sequence S1, the processor may identify other sequences of packets that were uploaded to the server by device D1 and carry respective other uploaded files, and compute the respective total sizes of these other uploaded sequences. For each of these other uploaded sequences, the processor may identify, with a particular level of confidence, a strongly corresponding downloaded sequence that was downloaded from the server by another client, and compute the size thereof (The downloaded sequences may be identified based on the proximity in time of the sequence to the uploaded sequence, based on similarity in size (ignoring packet size inflation, or using rough estimates for the inflation divisors), based on a relatively high relatedness score between the two devices, and/or based on any of the other factors mentioned above.) The processor may then compare the sizes of the uploaded sequences to the sizes of the downloaded sequences. Based on this comparison, and based on an assumed distribution of the divisor for downloads, the processor may compute the packet-size inflation divisor for uploads performed by device D1.

For example, by observing a large number of uploads and downloads of files of known sizes for various device types, operating systems, and encryption protocols, the processor may ascertain that the packet-size inflation divisor for both uploads and downloads is distributed (e.g., uniformly or normally) between 1.002 and 1.441. Assuming this distribution, if the sizes of the sequences uploaded by device D1 are generally greater than the sizes of the corresponding downloaded sequences, the processor may compute, for the uploading device, a packet-size inflation divisor that is closer to 1.441 than to 1.002. Conversely, if the sizes of the uploaded sequences are generally less than the sizes of the corresponding downloaded sequences, the processor may compute, for device D1, a packet-size inflation divisor that is closer to 1.002 than to 1.441.

In some embodiments, as assumed below, the processor computes the estimated file size as a probability distribution. For example, the processor may calculate the packet-size inflation divisor as a probability distribution, and then calculate an estimated file-size distribution by dividing the aforementioned sum of packet sizes by this probability distribution.

As noted above, in some cases, the processor is not certain that the sequence actually carries a file. In such cases, subsequently to estimating the file size, the processor may compare the estimated file size to a predefined threshold. In response to the estimated file size exceeding the predefined threshold, the processor may assume that the sequence indeed carries a file. In response thereto, the processor stores the estimated file size, along with other relevant properties of the sequence, in a database, as further described below with reference to FIG. 4. In the event that the processor knows a priori that the sequence carries a file, e.g., by virtue of the processor having identified the IP address of a messaging-application server known to service file exchanges, the processor may store the properties of the sequence even without first comparing the estimated file size to the predefined threshold.

Examples of relevant properties of a sequence that may be stored include the time at which the sequence was communicated and the direction of the sequence (i.e., whether the sequence was uploaded or downloaded). Other examples include properties of the device that performed the transfer, such as the device type, the operating system running on the device, the encryption protocol used by the device, or an identifier, such as an IP address, of the device. Alternatively or additionally, the processor may store identifying information for the user who performed the file transfer, and/or information relating to the application via which the file was transferred. Examples of such information include the IP address or certificate of the server to or from which the file was transferred, and the name of the application or the class of applications (e.g., "email") used for performing the transfer. Alternatively or additionally, the processor may store the level of confidence with which the processor posited that the sequence carries a file, and/or the level of confidence with which the processor estimated the file size.

In some embodiments, the processor, using machine-learned techniques, identifies, in report 38, instances in which a file was forwarded by the sending of a metadata link. The relevant parameters of each such instance are stored in the aforementioned database.

Finding Corresponding File Transfers

As described above with reference to FIG. 2, the processor is configured to find corresponding pairs of file transfers. For example, given a download of a file performed by a second user, the processor may find a strongly corresponding upload performed by a first user, which, together with the download performed by the second user, constitutes an exchange of the file between the two users. Alternatively or additionally, the processor may find other downloads of the file that occurred at approximately the same time as the given download, and/or other uploads or downloads of the file that occurred at previous times.

In general, the likelihood for each candidate corresponding file transfer is a function of the similarity between the respective estimated file sizes of the transfers. Thus, to evaluate the likelihood that a given pair of given file transfers correspond to one another, the processor computes a measure of similarity between the two estimates. For example, the processor may compute the absolute difference between the estimates, and/or compute a ratio between the estimates. The processor then computes the likelihood of correspondence as a function of this similarity measure.

Typically, the likelihood of correspondence is also a function of the "uniqueness" of the estimated file sizes; the more unique the file sizes are, the greater the likelihood of correspondence. (Typically, larger file sizes are more unique than, i.e., have smaller frequencies than, smaller file sizes.) Thus, given the estimated file size for one of the transfers, the processor may identify the frequency with which files having the estimated file size are communicated over the network. For example, the processor may look up the estimated file size in a histogram, which the processor may construct, in advance, from data from a large number of monitored file transfers. The processor may then posit the correspondence with a likelihood that is a decreasing function of the frequency.

In some cases, the likelihood of correspondence—and especially the likelihood of strong correspondence—may also be a function of the proximity in time between the two transfers.

Thus, for example, the processor may posit, with a relatively high likelihood, that sequence S1 and sequence S2 carry the same file, in response to the estimated file size for sequence S1 being relatively large, and also relatively close to the estimated file size for sequence S2. If the receipt time of the first packet of sequence S2 is within a relatively short duration of the receipt time of the last packet of sequence S1, the processor may further posit, with a relatively high likelihood, that the uploader of sequence S1 communicated the file to the downloader of sequence S2.

Alternatively or additionally to the factors described above, the likelihood of strong correspondence between an upload and a download may be a function of the relatedness score for the performer of the upload and the performer of the download. The processor may thus implement a reinforcement feedback loop, whereby positing a file exchange between two devices raises the likelihood of positing another file exchange between the devices in the future.

As noted above, in some embodiments, the processor identifies the sending of metadata links. As further described below, such instances may be treated as candidate corresponding file transfers for a given download, in response to (i) the metadata link having been sent prior to the given download, and (ii) the user who sent the link having downloaded a similarly-sized file within a predefined period of time prior to the sending of the link.

Example Algorithms

Processor 30 typically executes several different algorithms in parallel to each other. One of these algorithms, which is run continuously in the background as the monitored traffic is received, identifies file transfers in the traffic and stores the properties of these file transfers in a file-transfer database. Another algorithm, which is also run continuously in the background, identifies strongly corresponding file transfers in the file-transfer database and maintains a relationship database based on the identified strongly corresponding file transfers. Yet another algorithm handles queries from users of the system, using information in both the file-transfer database and the relationship database. These algorithms are hereby described with reference to FIGS. 4-7, respectively.

Figure 4:
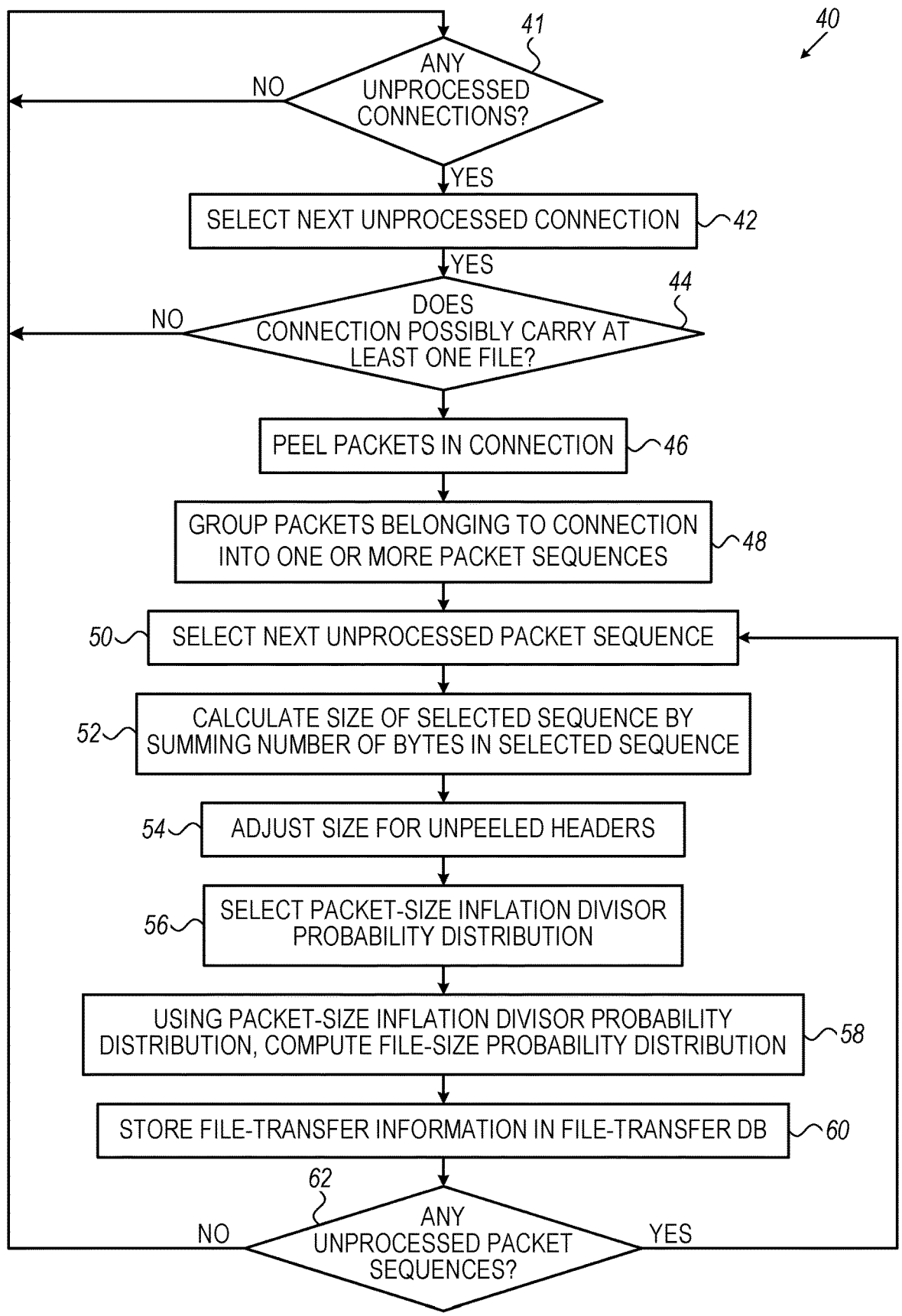
FIG. 4 is a flow diagram for an algorithm for maintaining a file-transfer database, in accordance with some embodiments of the present disclosure.

First, reference is made to FIG. 4, which is a flow diagram for an algorithm 40 for maintaining a file-transfer database, in accordance with some embodiments of the present disclosure.

Per algorithm 40, the processor repeatedly checks, at a first checking step 41, whether the communication traffic received from tap 32 (FIG. 1) includes any connections that have not yet been processed by the processor. In response to identifying at least one unprocessed connection, the processor selects the next unprocessed connection at a connection-selecting step 42. Subsequently, at a connection-examining step 44, the processor ascertains whether the selected connection possibly carries at least one file. If not, the processor ignores the connection, and returns to first checking step 41. Otherwise, the processor continues to process the connection.

In continuing to process the connection, the processor peels the packets in the connection, at a peeling step 46. Next, at a grouping step 48, the processor groups the packets in the connection into one or more packet sequences assumed to carry respective files, as described above with reference to FIG. 3.

Subsequently, at a sequence-selecting step 50, the processor selects one of the separated packet sequences. Next, at a size-calculating step 52, the processor calculates the size of the selected sequence by summing the number of bytes in the sequence. This size may then be adjusted (in particular, reduced) at a size-adjusting step 54, to account for any unpeeled headers.

Next, at a divisor-selecting step 56, the processor selects the appropriate probability distribution for the packet-size inflation divisor, as described above with reference to FIG. 3. Subsequently, using the selected probability distribution, the processor, at a file-size-computing step 58, computes a probability distribution for the size of the file assumed to be carried by the selected sequence of packets. (Next, the processor may compare a statistical measure, such as the mean, of this probability distribution to a predefined threshold, in order to verify that the sequence has a significant likelihood of carrying a file. If the threshold is not passed, the processor may skip to second checking step 62, described below.)

Subsequently, the processor stores information pertaining to the file transfer in the file-transfer database, at an information-storing step 60. Such information may include, for example, the time of the transfer, the source and destination IP addresses for the transfer, the computed file-size probability distribution, any identifiers of the file-transferring device or of the user thereof (e.g., a Mobile Station International Subscriber Directory Number (MSISDN) of the device or the name of the user), and/or information relating to the application or class of applications via which the file was transferred.

Subsequently to storing the file-transfer information, the processor checks, at a second checking step 62, whether any unprocessed packet sequences in the connection remain. If yes, the processor returns to sequence-selecting step 50, and selects the next unprocessed packet sequence. Otherwise, the processor returns to first checking step 41.

As noted above, while processing each connection, the processor may further identify the transfer of one or more metadata links. Information relating to each identified metadata-link transfer may be stored in the file-transfer database at information-storing step 60. Such information may include, for example, any of the example information items listed above, except for a file-size probability distribution, which is not applicable to a metadata-link transfer.

Figure 5:
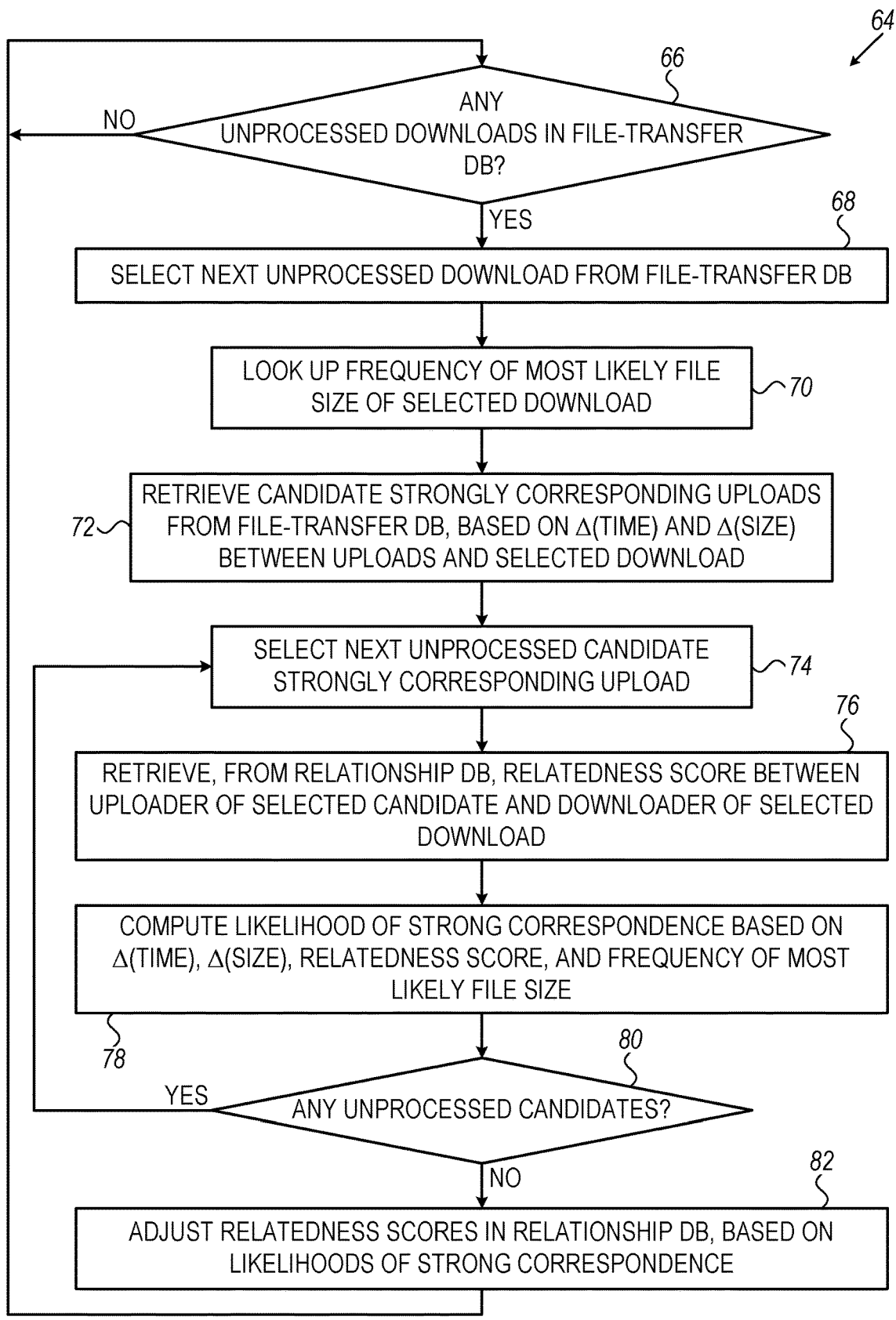
FIG. 5 is a flow diagram for an algorithm for maintaining a relationship database, in accordance with some embodiments of the present disclosure.

Reference is now made to FIG. 5, which is a flow diagram for an algorithm 64 for maintaining a relationship database, in accordance with some embodiments of the present disclosure.

Per algorithm 64, the processor repeatedly checks, at a third checking step 66, whether the file-transfer database contains any downloads that have not yet been processed by the processor. In response to identifying at least one unprocessed download, the processor selects the next unprocessed download from the file-transfer database, at a download-selecting step 68. Subsequently, the processor, at a first frequency-lookup step 70, looks up the frequency of the most likely file size of the selected download, which may be the mean of the file-size probability distribution stored for the download.

Subsequently, at a candidate-upload-retrieving step 72, the processor retrieves any candidate strongly corresponding uploads from the file-transfer database. This retrieval is typically based on the difference in time ("Δ(TIME)") and the difference in file size ("Δ(SIZE)") between the uploads and the selected download. (Δ(SIZE) may be quantified using any suitable statistical distance measure for probability distributions.) For example, the processor may require that, for any candidate, Δ(TIME) be less than a first predefined threshold and Δ(SIZE) be less than a second predefined threshold. In addition, the processor requires that each candidate be performed using the same application, or class of applications, as was the selected download. For example, if the selected download was performed using WhatsApp, the processor retrieves uploads performed using WhatsApp. If the specified download was performed using email, the processor retrieves uploads performed using any email application.

Subsequently to retrieving the candidate strongly corresponding uploads, the processor, at a candidate-upload-selecting step 74, selects one of the candidates. Next, at a score-retrieving step 76, the processor retrieves, from the relationship database, the current relatedness score between the uploader of the selected candidate strongly corresponding upload and the downloader of the selected download (provided this score exists in the relationship database). Subsequently, the processor, at a first likelihood-computing step 78, computes a likelihood of strong correspondence between the selected candidate and the selected download. This computation is based on (a) Δ(TIME), (b) Δ(SIZE), (c) the retrieved relatedness score, and (d) the frequency of the most likely file size of the selected download. (In particular, the likelihood of strong correspondence is generally a decreasing function of (a), (b), and (d), and is an increasing function of (c).)

Subsequently, the processor checks, at a fourth checking step 80, whether any unprocessed candidate strongly corresponding uploads remain. If yes, the processor returns to candidate-upload-selecting step 74, and selects the next unprocessed candidate upload.

In response to ascertaining, at fourth checking step 80, that no unprocessed candidates remain, the processor, at a score-adjusting step 82, adjusts the relatedness scores in the relationship database, based on the likelihoods of correspondence. For example, for any likelihood exceeding a predefined threshold, the processor may increase the corresponding score. (The "corresponding score" referred to in the sentence above is the score for the pair of users consisting of (a) the user who performed the selected download and (b) the user who performed the candidate strongly corresponding upload.)

Subsequently to adjusting the relatedness scores, the processor returns to third checking step 66.

Figure 6:
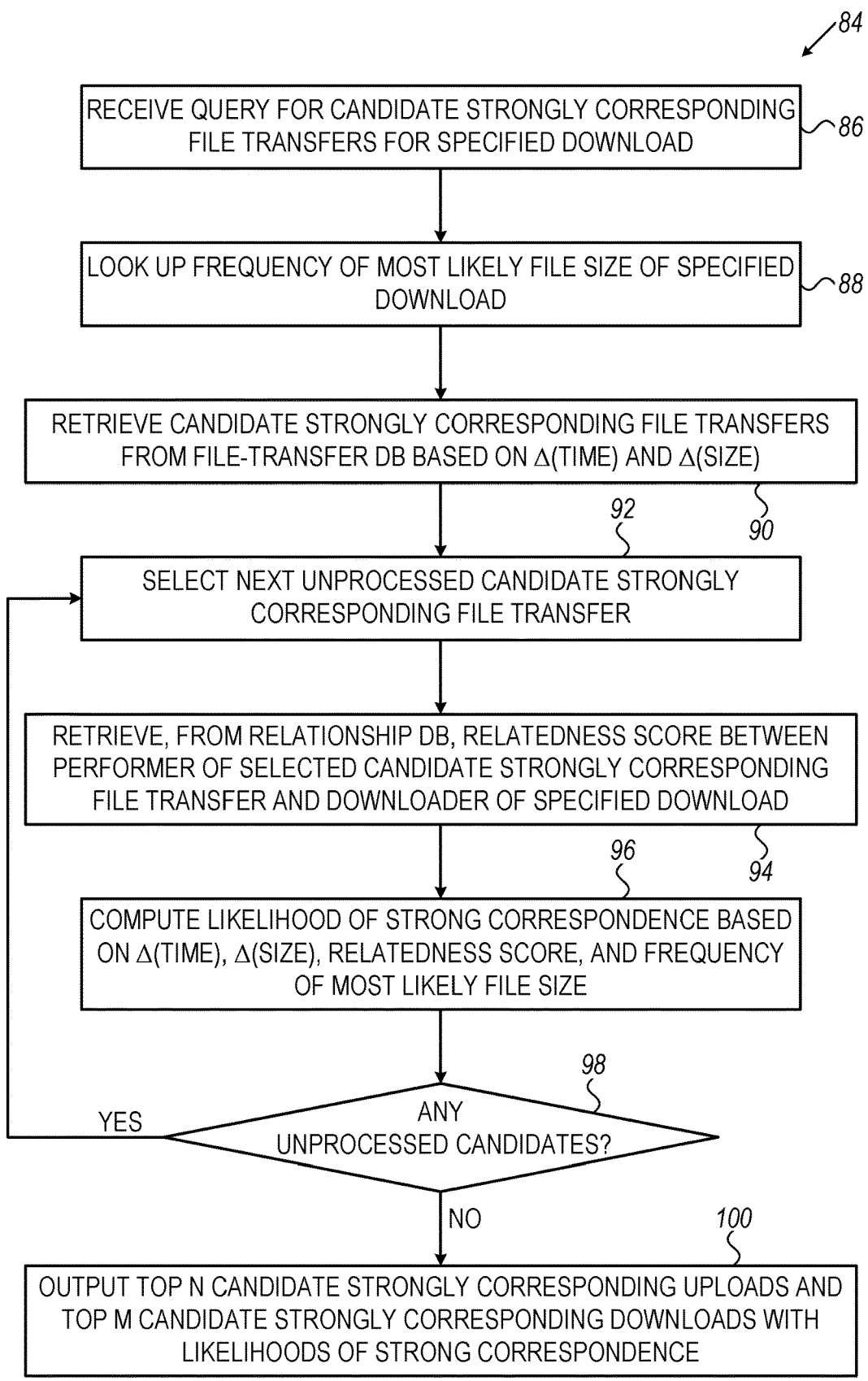
FIGS. 6-7 are flow diagrams for algorithms for handling queries, in accordance with some embodiments of the present disclosure.

Reference is now made to FIG. 6, which is a flow diagram for an algorithm 84 for handling a query, in accordance with some embodiments of the present disclosure.

Algorithm 84 begins with a first query-receiving step 86, at which the processor receives, from a user of the system, a query requesting a list of candidate strongly corresponding file transfers for a specified download.

In some cases, the specified download is retrieved, by the user, from the file-transfer database prior to the submission of the query. Alternatively, the specified download may be identified by the user without using the file-transfer database, in which case the download might not be stored in the file-transfer database.

Subsequently to receiving the query, the processor, at a second frequency-lookup step 88, looks up the frequency of the most likely file size of the specified download, provided that the most likely file size of the specified download is stored in the file-transfer database or is indicated explicitly or implicitly in the query. If the most likely file size is not available, second frequency-lookup step 88 is omitted.

Subsequently, the processor, at a first candidate-transfer-retrieving step 90, retrieves candidate strongly corresponding file transfers from the file-transfer database. In particular, the processor retrieves each file transfer (i.e., each upload and download) for which Δ(TIME) and Δ(SIZE), relative to the specified download, are sufficiently small, and which was performed using the same application, or class of applications, as was the specified download. The processor designates each retrieved file transfer as a candidate strongly corresponding file transfer.

In some embodiments, the processor further retrieves each metadata-link transfer, performed using the same application or class of applications as was used for the specified download, for which Δ(TIME) is sufficiently small, provided that the metadata-link transfer is preceded, within a predefined period of time, by one or more downloads, performed by the same user using the same application or class of applications, for which Δ(SIZE), relative to the specified download, is sufficiently small. The processor further defines one or more candidate strongly corresponding file transfers, each of these candidates consisting of the metadata-link transfer in combination with a different respective one of the preceding downloads. In other words, the processor treats the metadata-link transfer as if it were an upload of each of the previously-downloaded files.

For example, it will be assumed that a metadata-link transfer was performed by a particular user immediately prior to the specified download (i.e., prior to the specified download with a sufficiently small Δ(TIME)), and that three downloads whose sizes are within Δ(SIZE) of the size of the specified download were performed, by the particular user, prior to the metadata-link transfer within a predefined period of time. In such a case, the processor may define three candidate strongly corresponding file transfers, each consisting of the metadata-link transfer in combination with a different respective one of the three downloads.

Following first candidate-transfer-retrieving step 90, the processor selects one of the candidate strongly corresponding file transfers at a first candidate-transfer-selecting step 92. Subsequently, at a relatedness-score-retrieving step 94, the processor retrieves, from the relationship database, the relatedness score between the performer of the selected candidate strongly corresponding file transfer and the downloader of the specified download. (If no such score is stored in the relationship database, the processor assumes a default minimum value for the score.) Next, at a second likelihood-computing step 96, the processor computes the likelihood of strong correspondence between the specified download and the selected candidate strongly corresponding file transfer. This computation is based on Δ(TIME), Δ(SIZE), the relatedness score, and the frequency of the most likely file size (if available). (For a candidate consisting of a metadata-link transfer in combination with a preceding download, Δ(SIZE) is the difference between the size of the specified download and the size of the preceding download.)

Following second likelihood-computing step 96, the processor checks, at a fifth checking step 98, whether any unprocessed candidate strongly corresponding file transfers remain. If yes, the processor returns to first candidate-transfer-selecting step 92, and selects the next candidate.

Following the processing of all of the candidate strongly corresponding file transfers, the processor proceeds to a first top-candidate-outputting step 100. At first top-candidate-outputting step 100, the processor outputs those candidate strongly corresponding uploads having the highest likelihoods of strong correspondence from among all of the candidate strongly corresponding uploads, along with those candidate strongly corresponding downloads having the highest likelihoods of strong correspondence from among all of the candidate strongly corresponding downloads. (In this context and in the context of FIG. 7, "uploads" may include metadata-link transfers in combination with preceding downloads.) Each candidate is output along with its likelihood of strong correspondence.

The number "N" of top uploads that are output, along with the number "M" of top downloads that are output, may be predefined or specified in the query. Alternatively, these numbers may be calculated on the fly in response to the likelihoods of strong correspondence. For example, the processor may set N such that the likelihood of each of the top uploads is greater than a threshold likelihood, which may be defined as an absolute number or set to a particular percentile of the likelihoods for the candidate uploads. Similarly, the processor may set M such that the likelihood of each of the top downloads is greater than another threshold likelihood.

Figure 7:
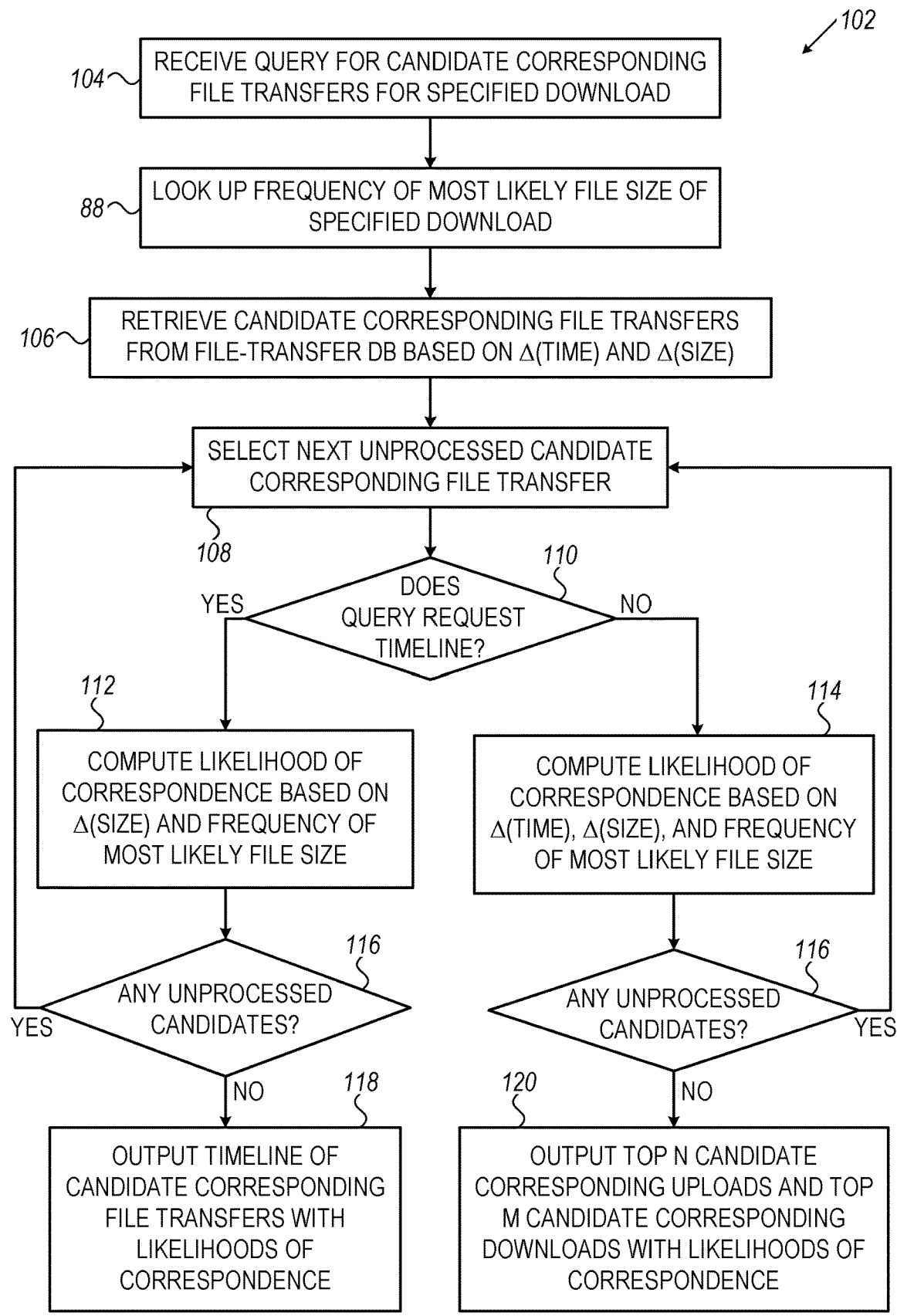

Reference is now made to FIG. 7, which is a flow diagram for another algorithm 102 for handling a query, in accordance with some embodiments of the present disclosure.

Algorithm 102 begins with a second query-receiving step 104, at which the processor receives a query from a user of the system. This query is similar to the query of FIG. 6, except that this query requests any candidate corresponding file transfers—rather than only strongly corresponding file transfers—for the specified download. Optionally, the user may request that the candidate corresponding file transfers be presented in a timeline, such as to facilitate tracking the distribution of the downloaded file and identifying the original distributor of the file.

Subsequently to receiving the query, the processor performs second frequency-lookup step 88, as described above with reference to FIG. 6. Next, at a second candidate-transfer-retrieving step 106, the processor retrieves candidate corresponding file transfers from the file-transfer database, based on Δ(TIME) and Δ(SIZE). (In this case, the candidates are not restricted to the same application or class of applications used to perform the specified download.)

As described above with reference to FIG. 6, in some embodiments, the processor designates transfers of metadata links, in combination with preceding downloads, as candidate corresponding file transfers. To reduce the number of false candidates, however, the processor may apply stricter retrieval criteria for transfers of metadata links than for file transfers. For example, the processor may require that Δ(TIME) (which, in the case of a metadata-link transfer in combination with a preceding download, is the difference between the time of the specified download and the time of the metadata-link transfer) be less for metadata-link transfers than for file transfers. Alternatively or additionally, the processor may require that Δ(SIZE) (which, in the case of a metadata-link transfer in combination with a preceding download, is the difference between the size of the specified download and the size of the preceding download) be less for metadata-link transfers than for file transfers.

Subsequently, at a second candidate-transfer-selecting step 108, the processor selects one of the candidate corresponding file transfers. Next, the processor computes the likelihood of correspondence for the selected candidate at either a third likelihood-computing step 112 or a fourth likelihood-computing step 114. In third likelihood-computing step 112, the computation is based on Δ(SIZE) and the frequency of the most likely file size (if available). In fourth likelihood-computing step 114, on the other hand, the computation is also based on Δ(TIME). At a query-evaluating step 110, the processor decides which of the two steps to perform: if the query requests a timeline of corresponding file transfers, the processor performs third likelihood-computing step 112; otherwise, the processor performs fourth likelihood-computing step 114.

(Since a timeline already conveys the respective chronological distances between the specified download and the candidate corresponding file transfers, it is assumed that the user does not want the likelihoods to take Δ(TIME) into account. Hence, third likelihood-computing step 112 does not take Δ(TIME) into account. Nevertheless, to reduce the number of unrelated file transfers included in the timeline, second candidate-transfer-retrieving step 106 takes Δ(TIME) into account.)

Following third likelihood-computing step 112 or fourth likelihood-computing step 114, the processor checks, at a sixth checking step 116, whether any unprocessed candidates remain. If yes, the processor returns to second candidate-transfer-selecting step 108 and selects the next candidate. Otherwise, the processor provides an output to the user, e.g., by displaying the output on display 36 (FIG. 1). In particular, if a timeline was requested, the processor, at a timeline-outputting step 118, outputs a timeline of the candidate corresponding file transfers (typically, all of the candidates retrieved at second candidate-transfer-retrieving step 106) with their respective likelihoods of correspondence. Otherwise, the processor, at a second top-candidate-outputting step 120, outputs those candidate corresponding uploads having the highest likelihoods of correspondence from among all of the candidate corresponding uploads, along with those candidate corresponding downloads having the highest likelihoods of strong correspondence from among all of the candidate corresponding downloads. Each candidate is output with its likelihood of correspondence. The number "N" of top uploads that are output, along with the number "M" of top downloads that are output, may be determined as described above with reference to FIG. 6.

In some cases, the user may request only corresponding downloads or only corresponding uploads. In such cases, the processor may execute algorithm 102 as described above, but retrieve only candidate corresponding downloads or only candidate corresponding uploads at second candidate-transfer-retrieving step 106.

It is noted that alternatively to using Δ(SIZE) in each of the algorithms in FIGS. 5-7, any other suitable measure of similarity between the sizes, such as a ratio between the sizes, may be used.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a peripheral device; and
a processor, configured to:
compute a measure of similarity between (i) a first estimated size of a first encrypted file content transferred over a network, via a first application on a first user device, over a first connection between the first user device and a first application server servicing the first application, and (ii) a second estimated size of a second encrypted file transferred over the network, via a second application on a second user device, over a second connection between the second user device and a second application server servicing the second application,
based on the measure of similarity, posit that the first encrypted file content and the second encrypted file content represent the same file, and
in response to the positing, generate an output to the peripheral device.

2. The system according to claim 1, wherein the first estimated size and the second estimated size are expressed as respective probability distributions.

3. The system according to claim 1,
wherein the first encrypted file content was uploaded by the first user device at a first time,
wherein the second encrypted file content was downloaded by the second user device at a second time subsequent to the first time,
wherein the processor is further configured to compute a difference between the second time and the first time, and
wherein the processor is configured to generate the output responsively to the difference being less than a predefined threshold.

4. The system according to claim 3, wherein the processor is configured to generate the output by increasing a relatedness score between a first user of the first user device and a second user of the second user device.

5. The system according to claim 1,
wherein the first encrypted file content was downloaded by the first user device at a first time,
wherein the second encrypted file content was downloaded by the second user at a second time subsequent to the first time,
wherein the processor is configured to generate the output in response to a metadata link having been communicated by the first user device between the first time and the second time, and
wherein the output indicates that the metadata link pointed to the file and was communicated to the second user device.

6. The system according to claim 1, wherein the output indicates that a first user communicated the file to a second user, and wherein the processor is configured to generate the output in response to a relatedness score between the first user and the second user.

7. The system according to claim 1, wherein the processor is further configured to identify a frequency with which files having the first estimated size are communicated over the network, and wherein the processor is configured to posit that the first encrypted file content and the second encrypted file content represent the same file with a likelihood that decreases with the frequency.

8. The system according to claim 1,
wherein the first encrypted file content was downloaded by the first user device at a first time,
wherein the second encrypted file content was downloaded by the second user device at a second time,
wherein the processor is further configured to compute a difference between the first time and the second time, and
wherein the processor is configured to generate the output responsively to the difference being less than a predefined threshold.

9. The system according to claim 1, wherein the processor is further configured to:
receive a query specifying a second-file-content transfer of the second encrypted file content, and
identify a first-file-content transfer of the first encrypted file content in response to the query,
wherein the processor is configured to compute the measure of similarity in response to identifying the first-file-content transfer, and
wherein the output includes parameters of the first-file-content transfer.

10. The system according to claim 9,
wherein the second-file-content transfer was performed using a class of applications, and
wherein the processor is configured to identify the first-file-content transfer of the first encrypted file content by:
retrieving, from a database, multiple other-file-content transfers of other encrypted file content, which were performed using the class of applications, and
identifying the first-file-content transfer from among the other-file-content transfers.

11. The system according to claim 9, wherein the processor is further configured to:
identify multiple other-file-content transfers of other encrypted file content in response to the query, and
posit that the file was transferred in each of the other-file-content transfers,
wherein the processor is configured to generate the output by outputting a timeline of the other-file-content transfers and the first-file-content transfer.

12. A system, comprising:
at least one network tap;
a data storage; and
a processor, configured to:
receive, through the at least one network tap, encrypted communication traffic passed over multiple connections, each of the connections being between a) one of a plurality of user devices and b) one of one or more servers, each server servicing an application on the user device connected thereto;
by analyzing the encrypted communication traffic, without decrypting the traffic, posit that at least one file was transferred over one connection of the connections,
in response to the positing, group encrypted packets belonging to the connection into at least one sequence,
compute an estimated size of the file, based on respective sizes of those of the packets belonging to the sequence, and
store the estimated size in the data storage.

13. The system according to claim 12, wherein the processor is configured to posit that the file was transferred over the connection in response to identifying, in one of the packets, an identifier of a server known to service file exchanges.

14. The system according to claim 12, wherein the processor is configured to posit that the file was transferred over the connection in response to an indication in one of the packets or in another packet that the connection was made by an application used for file transfers.

15. The system according to claim 14, wherein the indication includes a specification of a protocol used by a class of applications used for file transfers.

16. The system according to claim 12, wherein the processor is configured to group the packets by demarcating between the sequence and others of the packets that were communicated in the same direction as was the sequence.

17. The system according to claim 16, wherein the processor is configured to demarcate between the sequence and the others of the packets based on a time gap between the sequence and a closest one of the others of the packets.

18. The system according to claim 16, wherein the processor is configured to demarcate between the sequence and the others of the packets based on a decrease in throughput at an end of the sequence.

19. The system according to claim 12, wherein the processor is configured to compute the estimated size of the file by:
computing a sum of the respective sizes, and
computing the estimated size of the file by dividing the computed sum by a predefined packet-size inflation divisor that is greater than one.

20. The system according to claim 19, wherein the predefined packet-size inflation divisor is expressed as a probability distribution, such that the processor is configured to compute the estimated size as another probability distribution.

21. The system according to claim 19,
wherein the sequence was downloaded by one of the user devices, and
wherein the processor is further configured to, prior to computing the estimated size of the file:
identify another sequence of other packets downloaded by the user device,
compute another sum of respective sizes of the other packets,
posit that the other sequence carried another file having a known size, and
in response to the positing, compute the packet-size inflation divisor by dividing the other sum by the known size.

22. The system according to claim 19, wherein the sequence was exchanged between one of the servers and the user device connected thereto, and wherein the processor is further configured to, prior to computing the estimated size of the file:
infer one or more parameters from one or more of the connections belonging to the user device, and
select the packet-size inflation divisor from multiple predefined inflation divisors, based on a predefined association between the packet-size inflation divisor and the parameters.

23. The system according to claim 19,
wherein the sequence was uploaded by one of the user devices, and
wherein the processor is further configured to, prior to computing the estimated size of the file:
- identify, with respective levels of confidence, instances in which respective other files were communicated from the user device to respective other user devices, and
- based on the identified instances and on a predefined distribution of another packet-size inflation divisor for downloads, compute the packet-size inflation divisor.

24. A method, comprising:
computing a measure of similarity between (i) a first estimated size of first encrypted file content transferred over a network, via a first connection between a first user device and a first application server servicing an application on the first user device, and (ii) a second estimated size of second encrypted file content transferred over the network, via a second connection between a second user device and a second application server servicing an application on the second user device;
based on the measure of similarity, positing that the first encrypted file content and the second encrypted file content represent the same file; and
in response to the positing, generating an output.

\* \* \* \* \*